(12) United States Patent
Hattori

(10) Patent No.: US 8,001,110 B2
(45) Date of Patent: Aug. 16, 2011

(54) APPARATUS, METHOD, AND COMPUTER PROGRAM PRODUCT FOR PROCESSING DATABASES

(75) Inventor: Masakazu Hattori, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 514 days.

(21) Appl. No.: 12/207,752

(22) Filed: Sep. 10, 2008

(65) Prior Publication Data

US 2009/0132473 A1    May 21, 2009

(30) Foreign Application Priority Data

Sep. 11, 2007 (JP) ................................. 2007-235723

(51) Int. Cl.
*G06F 7/00* (2006.01)
*G06F 17/30* (2006.01)
(52) U.S. Cl. ...................................................... 707/714
(58) Field of Classification Search .................. None
See application file for complete search history.

(56) References Cited

U.S. PATENT DOCUMENTS 7,680,782 B2 * 3/2010 Chen et al. ............. 707/999.004

OTHER PUBLICATIONS

Per Bothner, Qexo: The GNU Kawa Implementation of XQuery, verified earliest date as May 14, 2002, on archive.org, http://www.gnu.org/software/qexo/.*
Fernandez, et al., Implementing XQuery 1.0: The Galax Experience, Proceedings of the 29th VLDB Conference, Berlin, Germany, 2003.

* cited by examiner

*Primary Examiner* — Pierre M Vital
*Assistant Examiner* — Jason Liao
(74) *Attorney, Agent, or Firm* — Turocy & Watson, LLP

(57) ABSTRACT

An obtaining request requesting that information is obtained from a structured database by using multiple loops is received. A unique identifier is assigned to each of records in element tables each having been created for a different one of the loops. A cross product joined table is created by performing a cross product joining process on the element tables, so that the information specified as an obtained target in the obtaining request is obtained from the element tables. For each of the loops, a single-loop table storing therein records in which the obtained information, the identifiers, and the elements are brought into correspondence is created. An inter-loop joined table is created by joining the plurality of single-loop tables. A correspondence between the records in the cross product joined table and in the inter-loop joined table are controlled, based on the identifiers contained in the cross product joined table and the inter-loop joined table.

9 Claims, 18 Drawing Sheets

FIG.2

```
<ROOT>
    <DEPARTMENT DATA>
        <DEPARTMENT> DISTRIBUTION </DEPARTMENT>
        <DEPARTMENT> LIGHTWEIGHT </DEPARTMENT>
    </DEPARTMENT DATA>
    <DECADE DATA>
        <DECADE> 1990S </DECADE>
        <DECADE> 2000S </DECADE>
    </DECADE DATA>
    <EMPLOYEE DATA>
        <EMPLOYEE> HATTORI
            <DECADE OF CORPORATION ENTRY> 1990S </DECADE OF CORPORATION ENTRY>
            <DEPARTMENT> DISTRIBUTION </DEPARTMENT>
            <DEPARTMENT> LIGHTWEIGHT </DEPARTMENT>
        </EMPLOYEE>
        <EMPLOYEE> NOMURA
            <DECADE OF CORPORATION ENTRY> 1990S </DECADE OF CORPORATION ENTRY>
            <DEPARTMENT> LIGHTWEIGHT </DEPARTMENT>
        </EMPLOYEE>
        <EMPLOYEE> KANAI
            <DECADE OF CORPORATION ENTRY> 1990S </DECADE OF CORPORATION ENTRY>
            <DEPARTMENT> DISTRIBUTION </DEPARTMENT>
        </EMPLOYEE>
        <EMPLOYEE> KUROKAWA
            <DECADE OF CORPORATION ENTRY> 2000S </DECADE OF CORPORATION ENTRY>
            <DEPARTMENT> DISTRIBUTION </DEPARTMENT>
        </EMPLOYEE>
    </EMPLOYEE DATA>
</ROOT>
```

FIG.4

```
for $x in //DEPARTMENT
for $y in //DECADE
let $z: =
    for $w in //EMPLOYEE
    where $w/DEPARTMENT = $x and $w/DECADE OF CORPORATION ENTRY = $y
    return $w/text()
return
    <RET>
        <DEPARTMENT> {$x} </DEPARTMENT> <DECADE> {$y> </DECADE>
        <EMPLOYEE> {$z} </EMPLOYEE>
    </RET>
```

FIG.5

```
<RET>
    <DEPARTMENT> DISTRIBUTION </DEPARTMENT> <DECADE> 1990S </DECADE>
    <EMPLOYEE> HATTORI KANAI </EMPLOYEE>
</RET>
<RET>
    <DEPARTMENT> DISTRIBUTION </DEPARTMENT> <DECADE> 2000S </DECADE>
    <EMPLOYEE> KUROKAWA </EMPLOYEE>
</RET>
<RET>
    <DEPARTMENT> LIGHTWEIGHT </DEPARTMENT> <DECADE> 1990S </DECADE>
    <EMPLOYEE> HATTORI NOMURA </EMPLOYEE>
</RET>
<RET>
    <DEPARTMENT> LIGHTWEIGHT </DEPARTMENT> <DECADE> 2000S </DECADE>
    <EMPLOYEE> </EMPLOYEE>
</RET>
```

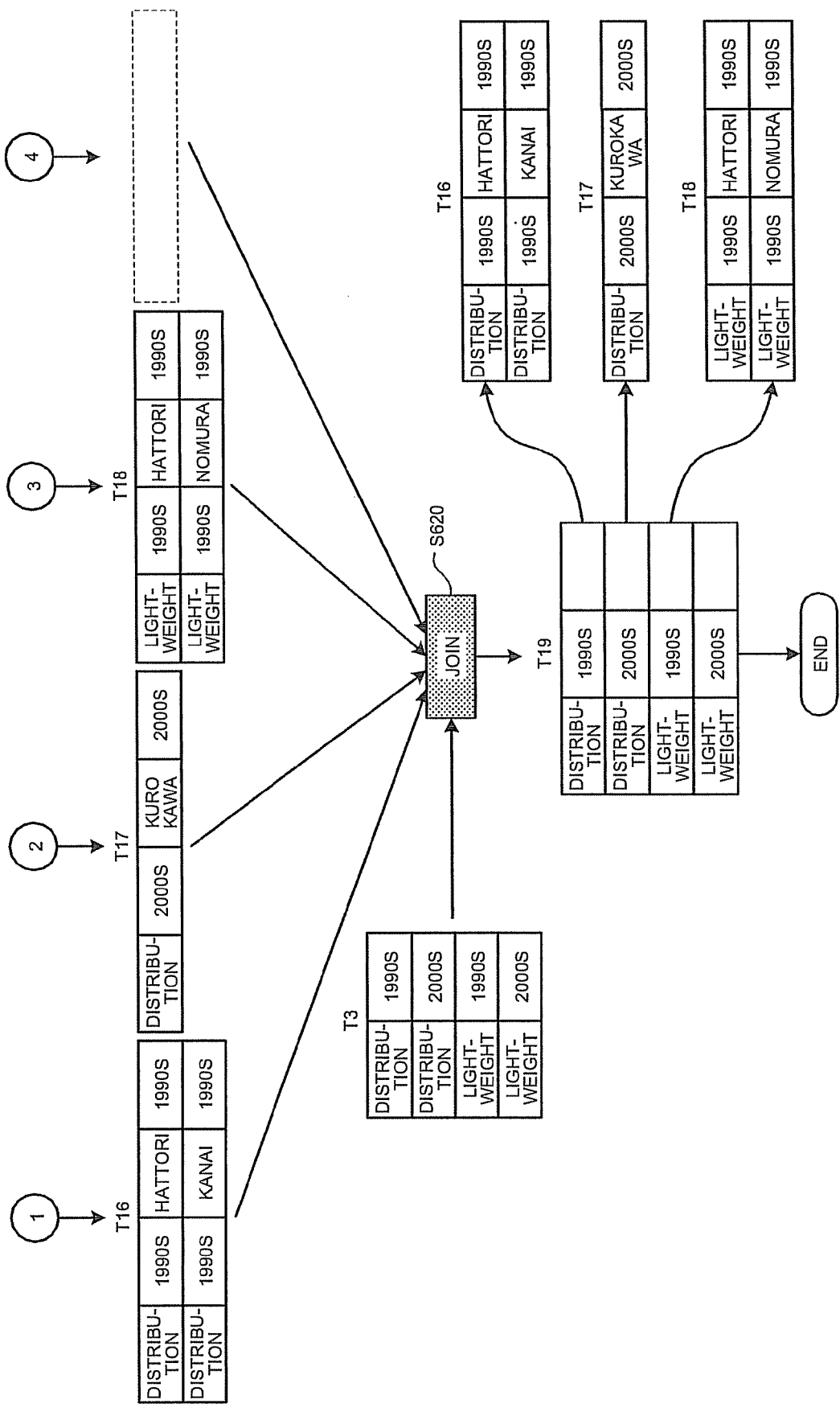

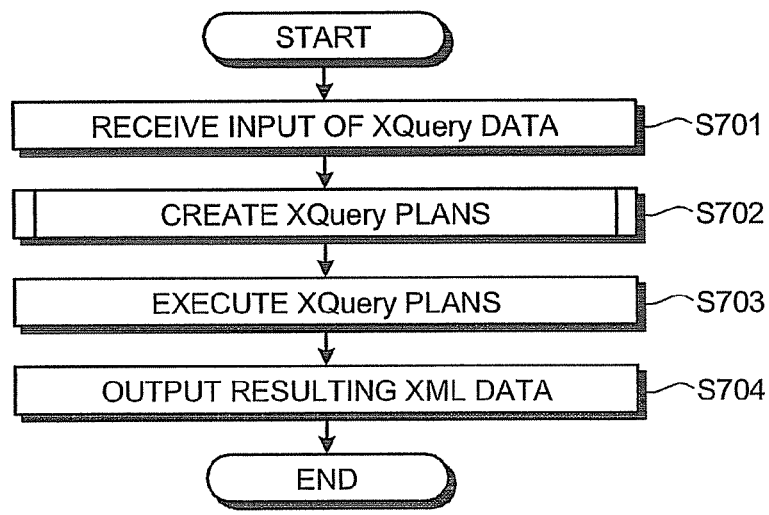
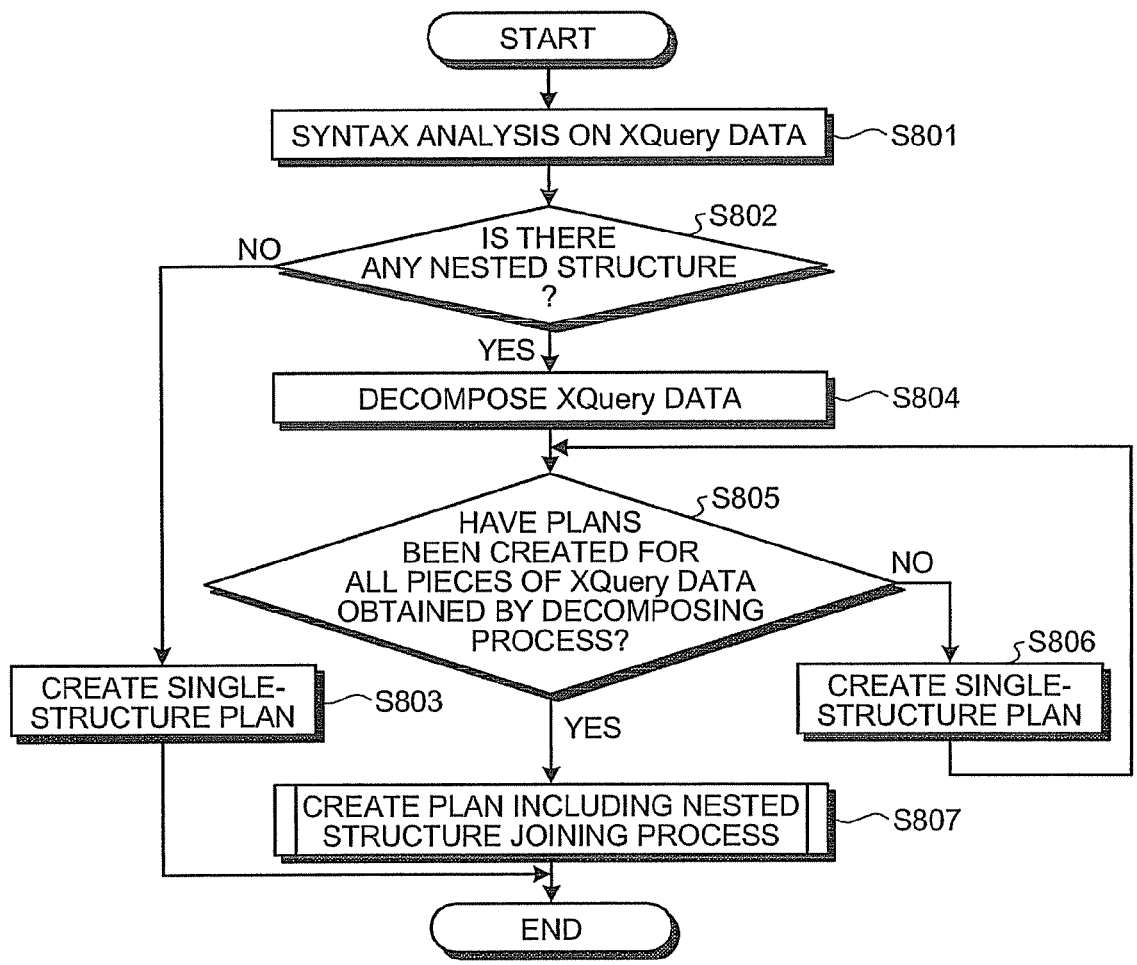

FIG.9

```
for $x in //DEPARTMENT
let $z: =
    for $w in //EMPLOYEE
    where $w/DEPARTMENT = $x
    return $w/text()
```

FIG.10

```
for $y in //DECADE
let $z: =
    for $w in //EMPLOYEE
    where $w/DECADE OF CORPORATION ENTRY = $y
    return $w/text()
```

FIG.14

```
for $x in //DEPARTMENT
for $y in //DECADE
let $z: =
    for $w in //EMPLOYEE
    where $w/DEPARTMENT = $x and $w/DECADE OF CORPORATION ENTRY = $y and $x/@id != $y/@id    ~1401
    return $w/text()
return
    <RET>
        <DEPARTMENT> {$x} </DEPARTMENT> <DECADE> {$y} </DECADE>
        <EMPLOYEE> {$z} </EMPLOYEE>
    </RET>
```

FIG.16

```
1601
for $a in //DEPARTMENT
for $b in //DECADE
let $c: =
  for $d in (MALE, FEMALE)
  let $e: =
    for $f in //EMPLOYEE
    where $f/DEPARTMENT = $a and $f/DECADE OF CORPORATION ENTRY = $b and $f/SEX = $d
    return $f/text()
  return $e
return $c
```

FIG.17

QueryA

```
for $a in //DEPARTMENT
  for $f in //EMPLOYEE
  where $f/DEPARTMENT = $a
  return $f/text()
return $a/text()
```

```
                                                        QueryB
for $b in //DECADE
        for $f in //EMPLOYEE
            where $f/DECADE OF CORPORATION ENTRY = $b
            return $f/text()
return $b/text()
```

```
                                                        QueryC
for $d in (MALE, FEMALE)
return $d/text()
```

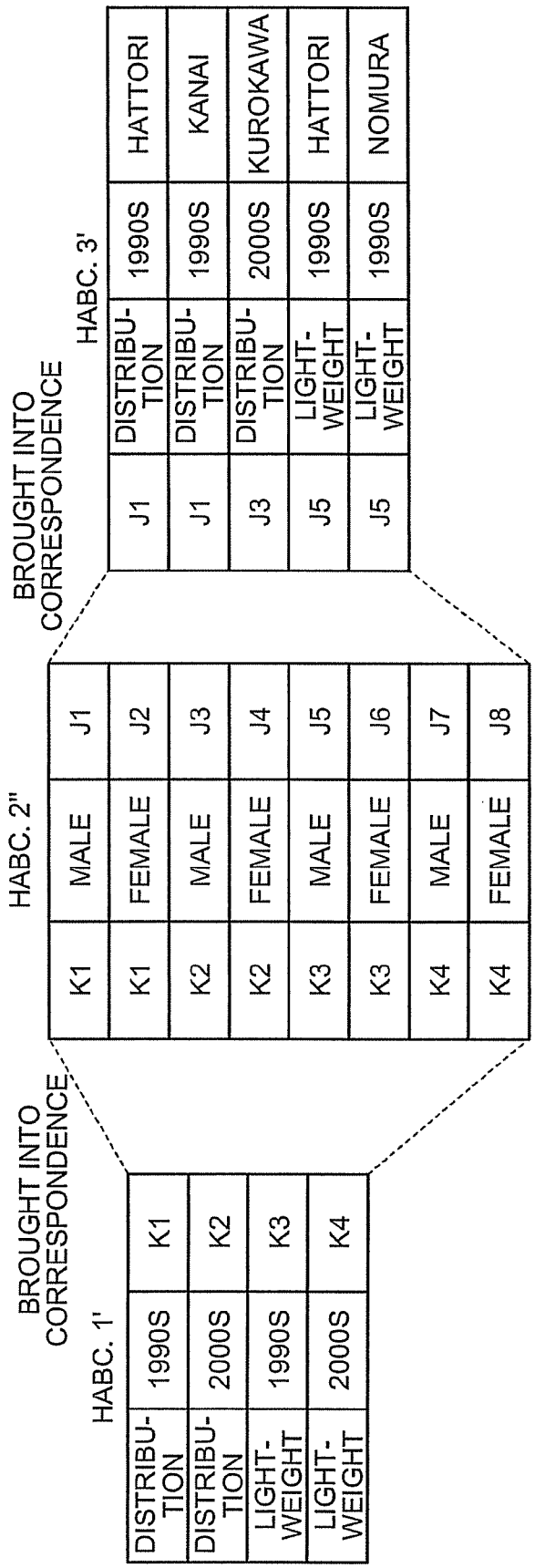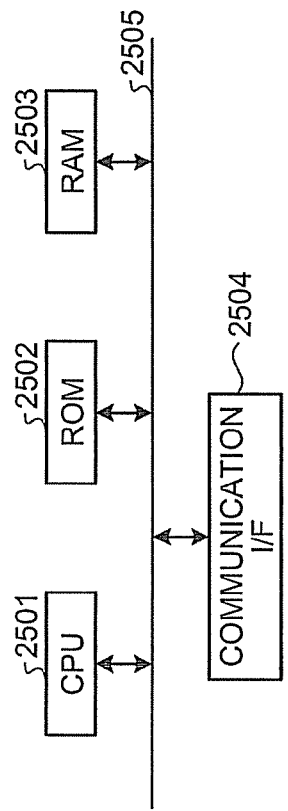

APPARATUS, METHOD, AND COMPUTER PROGRAM PRODUCT FOR PROCESSING DATABASES

CROSS-REFERENCE TO RELATED APPLICATIONS

This application is based upon and claims the benefit of priority from the prior Japanese Patent Application No. 2007-235723, filed on Sep. 11, 2007; the entire contents of which are incorporated herein by reference.

BACKGROUND OF THE INVENTION

1. Field of the Invention

The present invention relates to an apparatus, a method, and a computer program product for processing database that are used for processing structured documents having a hierarchical structure.

2. Description of the Related Art

In recent years, databases (e.g., XML databases) that store structured documents therein have become more prevalent, due to the growing popularity of structured documents like XML documents. As an example of languages that can be used for making queries to such databases, XQuery has been proposed.

XQuery is a function-type language that can be used for making XML queries and is characterized by having a FLWR syntax. The FLWR syntax denotes a syntax that includes a FOR clause, a LET clause, a WHERE clause, and a RETURN clause. An example of processes using XQuery is described in M. Fernandez, J. Simeon, B. Choi, A. Marian, G. Sur, Implementing XQuery 1.0: The Galax Experience, VLDB 2003.

In a FLWR syntax in XQuery, the FOR clause binds the items within a sequence to a variable. On the other hand, the LET clause binds the entire sequence to a variable. By combining the FOR clause and the LET clause, it is possible to make an advanced query that is suitable for XML. (It is not possible to express XML restructuring and aggregation without LET clauses.)

In XQuery, by using a LET clause, it is also possible to call a query having a nested structure in which a plurality of FOR clauses are used.

In database products that are currently available, LET clauses are often implemented so as to be compliant with a processing system for function-type languages. In the case where the implementation is in compliant with the processing system for function-type languages, when a query is made to a nested structure as described above, it is considered that there is an input output relationship between the outer XQuery data and the inner XQuery data in the nested structure. Thus, when the process on the outer XQuery data has been finished, each of the results of the process is forwarded, as a variable, to the inner XQuery data so that the inner XQuery data can be processed.

To make an advance query using XQuery, a nested structure as explained above is indispensable; however, a problem arises where, in the case where the implementation is in compliant with the processing system for function-type languages, the amount of calculation required by a nested structure having double or more nesting is large.

More specifically, because the processing system for function-type languages processes the inner portion after having processed the multiple loops in the outer portion, the process for the inner XQuery data is called as many times as the number of loops in the multiple loops. As a result, even if the number of nesting in the nested structure increases only by one, the amount of calculation increases by a huge amount.

SUMMARY OF THE INVENTION

According to one aspect of the present invention, a database processing apparatus includes a receiving unit that receives an obtaining request for requesting a process of obtaining information that is in correspondence with the same element as each of elements stored in partial syntax trees contained in the structured database, from another partial syntax tree, the process being a process of performing multiple loops in a nested structure, and the each of elements being used as a variable in each of the multiple loops; an identifier assigning unit that assigns a unique identifier to each of records stored in element tables, each of the element tables being created for each of the loops in the multiple loops; a joining unit that creates a cross product joined table in which a plurality of identifiers are assigned to each of records, by performing a cross product joining process on the element tables to which the identifiers have been assigned; an information obtaining unit that obtains information that is specified as an obtained target in the obtaining request based on the elements included in each of the element tables; a single-loop table creating unit that creates, for each of the loops, a single-loop table that stores records in which the obtained information, the identifiers, and the elements are brought into correspondence with one another; a joined table creating unit that creates an inter-loop joined table to which a plurality of identifiers are assigned, by joining the single-loop tables each of which is created for each of the loops; and a correspondence controlling unit that controls a correspondence between the records in the cross product joined table and the records in the inter-loop joined table, based on the plurality of identifiers assigned to the cross product joined table and the plurality of identifiers assigned to the inter-loop joined table.

According to another aspect of the present invention, a database processing method includes receiving an obtaining request for requesting a process of obtaining information that is in correspondence with the same element as each of elements stored in partial syntax trees contained in the structured database, from another partial syntax tree, the process being a process of performing multiple loops in a nested structure, and the each of elements being used as a variable in each of the multiple loops; assigning a unique identifier to each of records stored in element tables, each of the element tables being created for each of the loops in the multiple loops; creating a cross product joined table in which a plurality of identifiers are assigned to each of records, by performing a cross product joining process on the element tables to which the identifiers is assigned; obtaining information that is specified as an obtained target in the obtaining request based on the elements included in each of the element tables; creating, for each of the loops, a single-loop table that stores records in which the obtained information, the identifiers, and the elements are brought into correspondence with one another; creating an inter-loop joined table to which a plurality of identifiers are assigned, by joining the single-loop tables each of which is created for each of the loops; and controlling a correspondence between the records in the cross product joined table and the records in the inter-loop joined table, based on the plurality of identifiers assigned to the cross product joined table and the plurality of identifiers assigned to the inter-loop joined table.

A computer program product according to still another aspect of the present invention causes a computer to perform the method according to the present invention.

BRIEF DESCRIPTION OF THE DRAWINGS

FIG. 2 is a diagram illustrating an example of XML data that represents structured documents having a hierarchical structure;

FIG. 4 is a diagram illustrating a first example of XQuery data;

FIG. 5 is a diagram illustrating an example of XML data that represents a result obtained by processing the XQuery data shown in FIG. 4;

FIG. 6B is a drawing for explaining a second example in which the conventional processing procedure is performed on the input of the XQuery data shown in FIG. 4;

FIG. 7 is a flowchart of an overall processing procedure performed by a database processing apparatus;

FIG. 8 is a flowchart of a plan creating procedure performed by a nested XQuery-plan creating unit and a single XQuery-plan creating unit;

FIG. 9 is a diagram illustrating a first example of single XQuery data obtained by decomposing the XQuery data shown in FIG. 4;

FIG. 10 is a diagram illustrating a second example of single XQuery data obtained by decomposing the XQuery data shown in FIG. 4;

FIG. 14 is a diagram illustrating a second example of XQuery data;

FIG. 16 is a diagram illustrating a third example of XQuery data;

FIG. 17 is a diagram illustrating a first example of single XQuery data obtained by decomposing the XQuery data shown in FIG. 16;

FIG. 24 is a diagram illustrating tables that are created by a database processing apparatus according to a third modification example, in correspondence with the XQuery data shown in FIG. 16; and FIG. 25 is a diagram illustrating a hardware configuration of a database processing apparatus.

DETAILED DESCRIPTION OF THE INVENTION

Figure 1:
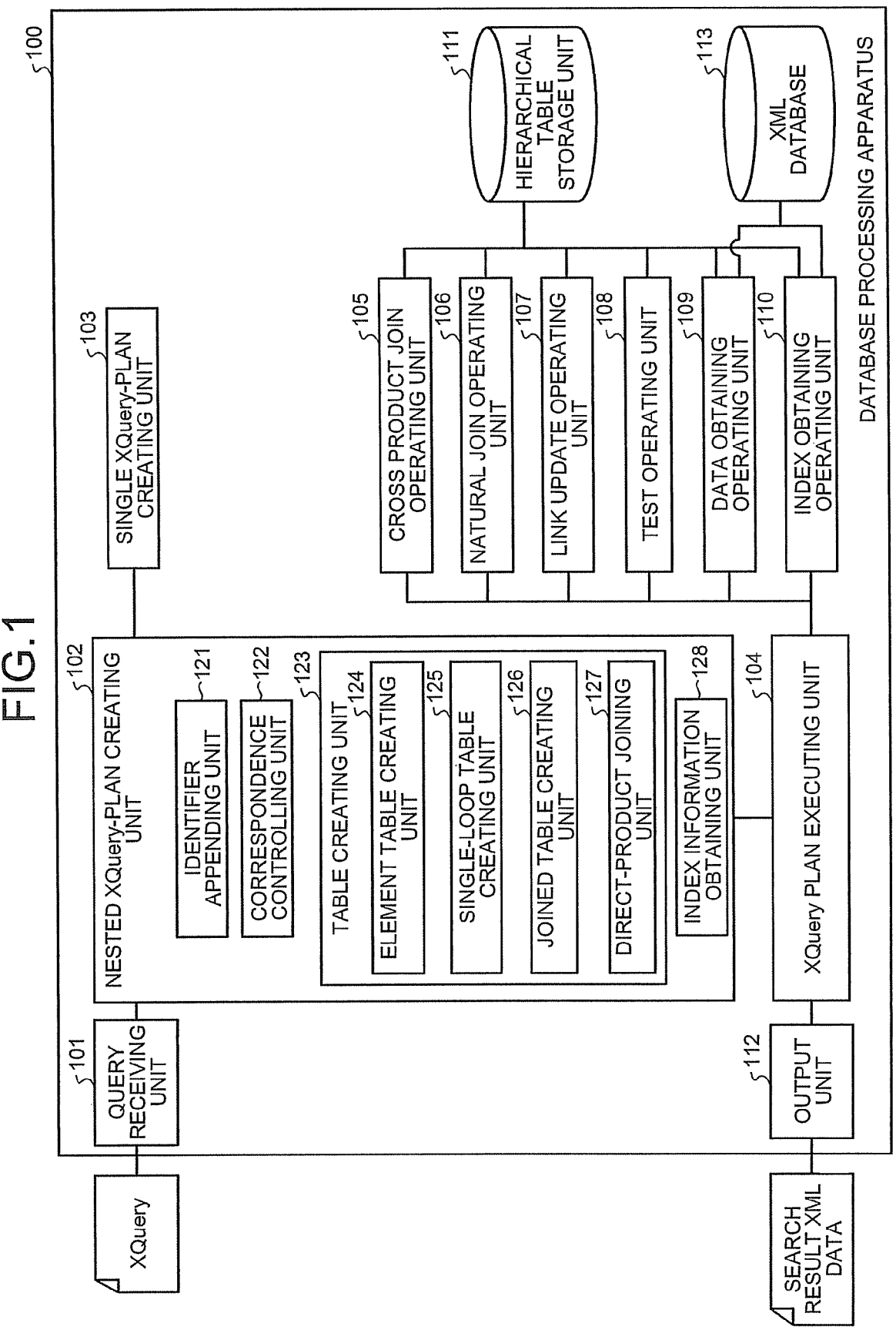
FIG. 1 is a diagram illustrating an overall configuration of a database processing apparatus according to a first embodiment of the present invention.

As shown in FIG. 1; a database processing apparatus 100 according to a first embodiment of the present invention includes: a query receiving unit 101; a nested XQuery-plan creating unit 102; a single XQuery-plan creating unit 103; an XQuery plan executing unit 104; a cross product join operating unit 105; a natural join operating unit 106; a link update operating unit 107; a test operating unit 108; a data obtaining operating unit 109; an index obtaining operating unit 110; an output unit 112; a hierarchical table storage unit 111; and an XML database 113.

The XML database 113 is a database that stores therein XML data representing structured documents having a structure with a plurality of hierarchical levels. In XML data, each of the individual parts that constitute the structured documents is referred to as an "element". Each of the elements is written by using tags. More specifically, each of the elements is expressed by placing data between two tags that are namely a tag indicating the start of the element (hereinafter, a "start tag") and a tag indicating the end of the element (hereinafter, an "end tag"). In each of the elements, the text data that is placed between the start tag and the end tag is referred to as a text element (i.e., a text node) contained in the element.

In the example shown in FIG. 2, the data is structured with a plurality of pieces of partial XML data that are placed between a start tag <ROOT> and an end tag </ROOT>. The pieces of partial XML data include a piece of data that is placed between a start tag <DEPARTMENT DATA> and an end tag </DEPARTMENT DATA> and is related to the name of a department in the corporation to which one belongs; a piece of data that is placed between a start tag <DECADE DATA> and an end tag </DECADE DATA> and is related to a decade in terms of the calendar years; and a piece of data that is placed between a start tag <EMPLOYEE DATA> and an end tag </EMPLOYEE DATA> and is related to one or more employees. As explained here, the XML data shown in FIG. 2 is configured so that mutually different types of data are stored in mutually different partial syntax trees and in mutually different hierarchical levels. With this arrangement, the one piece of XML data is able to hold therein various types of data.

Figure 3:
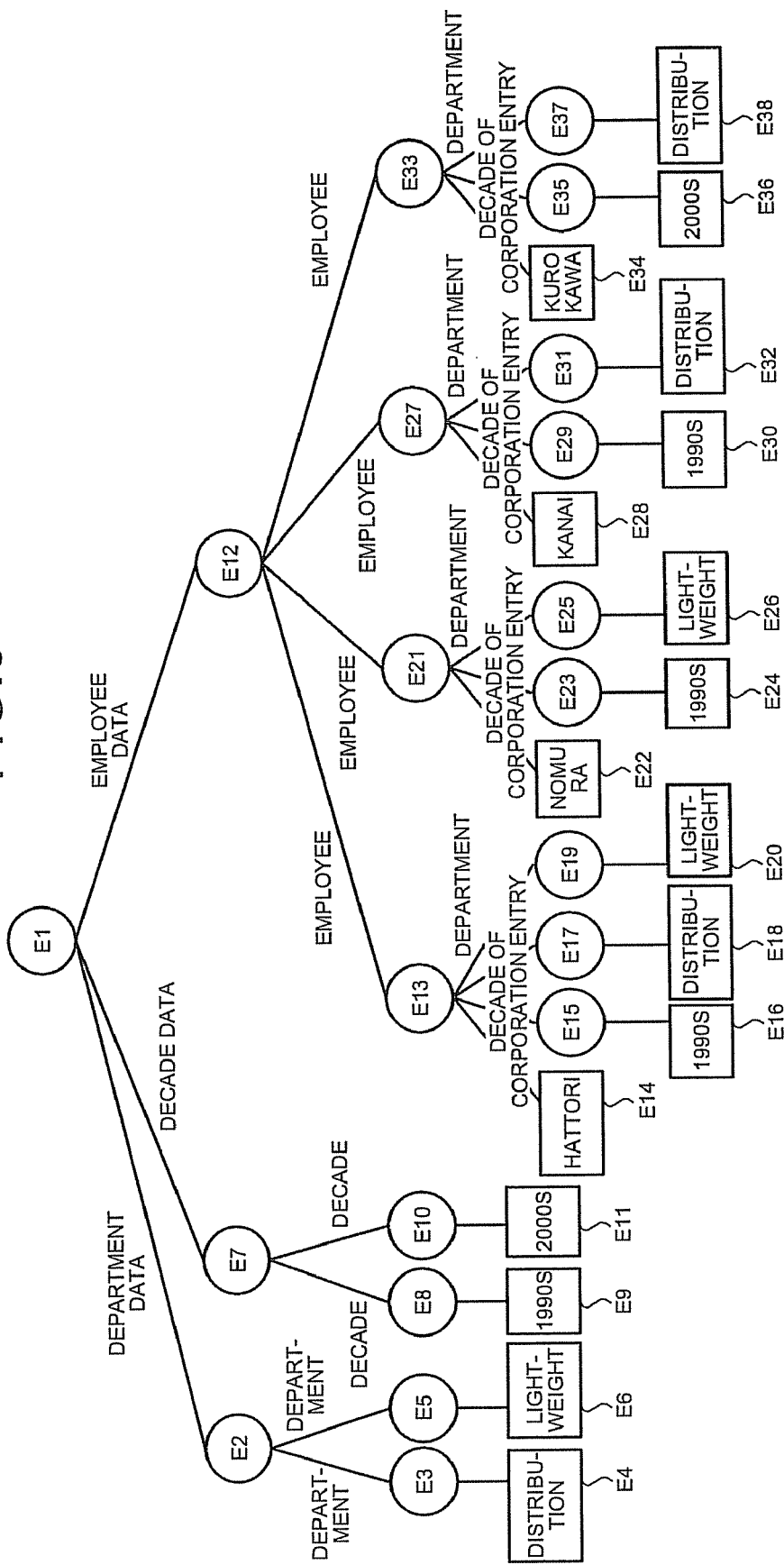
FIG. 3 is a conceptual diagram illustrating the XML data shown in FIG. 2, expressed by using a tree structure.

The XML data shown in FIG. 2 can be expressed by using a syntax tree as shown in FIG. 3. The XML data is expressed by using objects and links in a format that is similar to the Document Object Model (DOM). Each of the objects expresses a different one of the elements explained above.

For example, the object E1 represents an element expressing <ROOT>. In other words, the syntax tree expresses that one <DEPARTMENT DATA> object is positioned immediately under the <ROOT> object and is joined to the <ROOT> object by a link expressing a parent-child relationship.

In the following sections, any portion of a syntax tree will be referred to as a partial syntax tree. The syntax tree shown in FIG. 3 is made up of a partial syntax tree including the department data E2 and its subordinates; a partial syntax tree including the decade data E7 and its subordinates; and a partial syntax tree including the employee data E12 and its subordinates. Each of these partial syntax trees is made up of smaller partial syntax trees. For example, the partial syntax tree including the department data E2 and its subordinates is made up of a partial syntax tree including the department data E3 and its subordinates and a partial syntax tree including the department data E5 and its subordinates.

Text objects expressing the text nodes as explained above are positioned in the lowest hierarchical level of these objects. Each of these text objects is shown with a rectangular in the example in FIG. 3. For example, the object E4 is a text node that stores therein "DISTRIBUTION" as a text element.

The hierarchical table storage unit 111 stores therein a plurality of hierarchical tables that are created during execution of XQuery queries. The hierarchical relationships among these tables are formed according to the nested structure in the XQuery data. The details will be explained later.

In the hierarchical table storage unit 111, the hierarchy is expressed by using links. The technique used for expressing the hierarchy among the tables is equivalent to the technique related to the "relations" in a Relational Database (RDB). Thus, the explanation thereof will be omitted. Each hierarchical table is made up of elements called columns and records, like in a conventional RDB.

The XML database 113 and the hierarchical table storage unit 111 may each be configured with any type of storage means that is commonly used, such as a Hard Disk Drive (HDD), an optical disk, a memory card, or a Random Access Memory (RAM). In the first embodiment, the XML database 113 and the hierarchical table storage unit 111 are each configured with an HDD so that the data is stored therein permanently. However, another arrangement is acceptable in which the data is temporarily stored in a RAM as needed.

Returning to the description of FIG. 1, the query receiving unit 101 receives an input of a query request that is written in XQuery and is made about the XML database 113.

Next, the linguistic specification of XQuery will be explained from the aspect of procedures. As explained above, XQuery includes a FOR clause, a LET clause, a WHERE clause, and a RETURN clause. A syntax using a FOR clause is expressed as "for VARIABLE in EXPRESSION". The syntax using a FOR clause expresses an instruction instructing that a value satisfying the expression should be assigned to the variable so that a loop is generated.

A syntax using a LET clause is expressed as "let VARIABLE:=EXPRESSION". The syntax using a LET clause expresses an instruction instructing that a value satisfying the expression should be aggregated and be assigned to the variable as a sequence. In this situation, the sequence denotes a flat list.

A syntax using a WHERE clause is expressed as "where EXPRESSION". The WHERE clause restricts a repeatedly-processed loop according to the expression. In other words, an instruction sentence including a WHERE clause denotes an instruction instructing that the loop process should be performed if the condition expressed by the expression is satisfied, and the loop should be skipped if the condition expressed by the expression is not satisfied.

A syntax using a RETURN clause is expressed as "return EXPRESSION". The RETURN clause is used for outputting a result obtained by processing XQuery data, while the result is in a certain format. Accordingly, in the expression contained a RETURN clause, for example, it is possible to write arbitrary XML data including a variable.

Each of the variables as explained above that are used in the FLWR syntax is defined in the form of "$ CHARACTER STRING". In the case where the variables are defined in this manner, any variables having mutually the same character string are regarded as the same variables, except when a double structure is declared due to a nested structure including a main query and a sub query.

In XQuery, path operators used for specifying hierarchical conditions among the elements in XML data can be explained as follows. In the following sections, three different types of examples of path operators will be explained: The first example of a path operator is "/", which expresses a parent-child relationship between elements. More specifically, the operator expresses that the element positioned on the right side of "/" is a child of the element positioned on the left side of "/".

The second example of a path operator is "//", which expresses an ancestor-descendant relationship between elements. More specifically, the operator expresses that the element positioned on the right side of "//" is a descendant of the element positioned on the left side of "//". Lastly, the third example of a path operator is ".", which expresses an arbitrary element. The path operators are not limited to these examples. The XML data may contain processes that are expressed by any other operators.

As explained above, XQuery is a function-type language used for making a query to XML data. Conventionally, Structured Query Language (SQL) has been used as a language to make a query to a RDB. One of the differences is that, while SQL is a declarative language, XQuery is characterized by being a function-type language.

The query receiving unit 101 receives an input of XQuery data containing one or more of the syntaxes and the operators that have been explained above. It is assumed that the XQuery data has been input from a user, another system, or the like. The database processing apparatus 100 according to the first embodiment is characterized by the processes performed on XQuery data having a nested structure. Next, XQuery data having a nested structure will be explained.

The XQuery data shown in FIG. 4 denotes a request requesting that "combinations of DEPARTMENTs ($x) being descendants of the root and DECADEs ($y) being descendants of the root in the XML database should be generated; for each of the generated combinations, an employee ($w) being a descendant of the root matching the combination (i.e., the department and the decade) should be extracted; and the text of the extracted employee (i.e., the name of the employee) should be returned as a sequence".

In other words, the XQuery data shown in FIG. 4 denotes a request to the XML database requesting that combinations of the elements that are stored in the partial syntax trees contained in the XML database should be generated; and information that matches each of the combinations should be obtained from another partial syntax tree, by using each of the elements as a variable in each of the loops in the double loop. In the XQuery data in the present example, the double loop denotes a loop expressed as "for $x in //DEPARTMENT" and a loop expressed as "for $y in //DECADE".

In the case where the XML data shown in FIG. 2 is processed by using the XQuery data shown in FIG. 4, the database processing apparatus 100 creates XML data as shown in FIG. 5. In other words, the database processing apparatus 100 creates the XML data that is conformed to a format defined in the RETURN clause, by using the data obtained according to the FOR clause, the LET clause, and the WHERE clause shown in FIG. 4.

Next, an example of a conventional processing procedure that is performed to process XML data using XQuery will be explained, with reference to FIGS. 6A and 6B. In the conventional XQuery process, in the case where a LET clause is in the inner portion of a nested structure, it is considered that there is an input output relationship between the outer portion and the inner portion of the nested structure. In other words, when the process on the outer XQuery data of the nested structure has been finished, the results of the process are specified as a set of input variables and forwarded to the inner XQuery data so that the inner XQuery data can be processed. In the following sections, a specific example will be explained.

First, by using a data obtaining operating unit, a conventional database processing apparatus obtains a data column corresponding to $x out of the XML data and creates a table T1 (step S601) and also obtains a data column corresponding to $y out of the XML data and creates a table T2 (step S602). The processes at steps S601 and S602 correspond to the operator "//" in the XQuery data shown in FIG. 4.

The table T1 created in the process described above is structured so as to include two records having one column. As shown in FIG. 6A, the records in the table T1 store therein "DISTRIBUTION" and "LIGHTWEIGHT", respectively, that correspond to "//DEPARTMENT" in the XQuery data.

Similarly, the table T2 is also structured so as to include two records having one column. The records in the table T2 store therein "1990s" and "2000s", respectively, that correspond to "//DECADE" in the XQuery data.

Next, the conventional database processing apparatus performs a cross product joining operation on the table T1 and the table T2, by using a cross product join operating unit, and creates a table T3 (step S603). As shown in FIG. 6A, the created table T3 is structured so as to include four records having two columns.

The processes at steps S601 through S603 described above correspond to the processes performed on the outer portion of the nested structure. After the process on the outer XQuery data has been finished, the information of the records stored in the table T3 is specified as a set of input variables and forwarded to the inner XQuery data so that the inner XQuery data can be processed.

First, the conventional database processing apparatus copies each of the records in the table T3. More specifically, the conventional database processing apparatus copies the first record in the table T3 and creates a table T4 that is structured so as to include only one record (step S604). Similarly, the conventional database processing apparatus copies the second record in the table T3 and creates a table T5 (step S605), copies the third record in the table T3 and creates a table T6 (step S606), and copies the fourth record in the table T3 and creates a table T7 (step S607).

It is assumed herein that two types of index data are assigned, in advance, to the XML database shown in FIG. 2. One is an index 1 that returns a set "EMPLOYEE/text( )" by using "DEPARTMENT/text( )" as a key. The other is an index 2 that returns a set "EMPLOYEE/text( )" by using "DECADE OF CORPORATION ENTRY/texto" as a key. In this situation, the "DECADE OF CORPORATION ENTRY" denotes the decade during which the employee joined the corporation.

After that, by using an index obtaining operating unit, the conventional database processing apparatus accesses the index 1 explained above by using the first column in the table T4 as a search key. In other words, because the table T4 is structured with one record that is namely ["DISTRIBUTION", "1990s"], the conventional database processing apparatus accesses, by using the index obtaining operating unit, the index 1 by using the first column "DISTRIBUTION" as a search key and obtains a set that matches the condition indicated by the search key (step S608). The set that has been obtained in this process is developed into the third column in a table T8. As shown in FIG. 6A, the obtained set made up of "HATTORI", "KANAI", and "KUROKAWA" are stored into the table T8 as separate records.

Further, with respect to the table T5, the conventional database processing apparatus also accesses the index 1 by using the first column "DISTRIBUTION" as a search key and obtains a set so as to create a table T9 (step S609). With respect to the tables T6 and T7, the conventional database processing apparatus also performs the similar process (steps S610 and S611).

Subsequently, by using a data obtaining operating unit, the conventional database processing apparatus obtains the "decades of corporation entry" that are stored in correspondence with the names of the employees out of the XML database, by using the names of the employees in the third column of the table T8 as a search key (step S612). The conventional database processing apparatus further creates a table T12 in which the "decades of corporation entry" that have been obtained are stored in the fourth column.

Similarly, with respect to the tables T9, T10, and T11, the conventional database processing apparatus creates tables T13, T14, and T15 with the "decades of corporation entry" that have been obtained by using the names of the employees in the third column as a search key (steps S613, S614, and S615).

After that, by using a test operating unit, the conventional database processing apparatus tests the table T12 by using a comparison condition to check to see if the second column is equal to the fourth column and creates a table T16 shown in FIG. 6B (step S616).

Similarly, the conventional database processing apparatus also tests the tables T13 and T14 by using the comparison condition to check to see if the second column is equal to the fourth column and creates tables T17 and T18 as shown in FIG. 6B (Steps S617 and S618). Further, the conventional database processing apparatus also tests the table T15 by using the comparison condition to check to see if the second column is equal to the fourth column. However, because there is no matching record, the eventual table has blank records therein and, no table is created (step S619).

After that, the conventional database processing apparatus performs a process of bringing the created tables T16 to T18 into correspondence with the table T3 (step S620). As a result of this process, the conventional database processing apparatus is able to paste one-way links from a table T19 to the tables T16, T17, and T18.

By adjusting the form of the information stored in the tables T19, T16, T17, and T18 using the format written in the RETURN clause in the XQuery data shown in FIG. 4, it is possible to obtain the XML data shown in FIG. 5. In the processes performed by the conventional database processing apparatus described above, a process is performed on each of the records in the tables created in the cross product joining processes. Thus, the problem arises where the amount of calculation is extremely large. In contrast, the database processing apparatus 100 according to the first embodiment is able to inhibit the increase in the amount of calculation by having the configuration described below.

The nested XQuery-plan creating unit 102 includes an identifier assigning unit 121, a correspondence controlling unit 122, a table creating unit 123, and an index information obtaining unit 128. In the case where the XQuery data that has been received as an input by the query receiving unit 101 has a nested structure, the nested XQuery-plan creating unit 102 outputs a plan for extracting pieces of XQuery data each being a portion of the nested structure and processing the nested structure. The extracted pieces of XQuery data will be explained in detail later.

In the case where the XQuery data that has been received as an input by the query receiving unit 101 has no nested structure, the single XQuery-plan creating unit 103 outputs a plan for processing the XQuery data.

Also, in the case where the nested XQuery-plan creating unit 102 has extracted pieces of XQuery data each being a portion of the nested structure out of the XQuery data received as an input by the query receiving unit 101 has a nested structure, the single XQuery-plan creating unit 103 outputs, for each of the extracted pieces of XQuery data, a plan for processing the piece of XQuery data. Each of the output plans is expressed as a series of processes performed by the various types of operating units explained below. The plan created by the single XQuery-plan creating unit 103 is output to the nested XQuery-plan creating unit 102. Next, the constituent elements that create the plans for processing the XQuery data will be explained.

The table creating unit 123 includes an element table creating unit 124, a single-loop table creating unit 125, a joined table creating unit 126, and a cross product joining unit 127. The table creating unit 123 creates plans for creating tables. According to the created plans, the tables are created via the XQuery plan executing unit 104. The details of the process to create the tables will be explained later. Next, the table creating plans created by the constituent elements will be explained.

For each of the loops in the multiple loops within the XQuery nested structure, the element table creating unit 124 creates a plan for creating an element table in which elements expressed as variables in the loop are stored as separate records. According to the created plan, the element tables are created by the plurality of operating units explained later, via the XQuery plan executing unit 104.

For each of the loops in the multiple loops within the XQuery nested structure, The single-loop table creating unit 125 creates a plan for creating a single-loop table that stores therein records in which the elements stored in the element table, the identifiers (i.e., IDs) assigned by the identifier assigning unit 121 as explained later, and index information obtained by the index information obtaining unit 128 as explained later are brought into correspondence with one another. According to the created plan, single-loop tables are created via the XQuery plan executing unit 104.

The cross product joining unit 127 creates a plan for creating a superordinate table (i.e., a cross product joined table) in which a plurality of IDs are assigned to each of the records, by performing a cross product joining process on the element tables to which IDs have been assigned according to a plan created by the identifier assigning unit 121. According to the plan created by the cross product joining unit 127, a superordinate table is created via the XQuery plan executing unit 104. The superordinate table will be explained in details later.

The joined table creating unit 126 creates a plan for creating an inter-loop joined table in which mutually different IDs assigned by the identifier assigning unit 121 are respectively stored in the plurality of columns, by joining the single-loop tables each of which has been created for a different one of the loops by the single-loop table creating unit 125. According to the created plan, the inter-loop joined table is created via the XQuery plan executing unit 104.

The identifier assigning unit 121 creates a plan for assigning a unique ID to each of the records in the element tables each of which has been created for a different one of the loops. According to the created plan, the unique ID is assigned to each of the records via the XQuery plan executing unit 104. The details of the process to assign the IDs will be explained later.

According to each of the elements (i.e., the records) in each of subordinate tables, the index information obtaining unit 128 creates a plan for obtaining, as index information, information that is specified as an obtained target in the XQuery query request. The plan created by the index information obtaining unit 128 further contains a process to add the obtained index information to each of the records in the subordinate tables. According to the created plan, for each of the records in the subordinate tables, the corresponding piece of index information is obtained and added to the record, via the XQuery plan executing unit 104.

The correspondence controlling unit 122 creates a plan for controlling a correspondence between (i) the records in the table obtained by performing the cross product joining process on the element tables to which the unique IDs have been assigned and (ii) the records in the inter-loop joined table that has been created by the joined table creating unit 126. Accordingly, the records are controlled a correspondence with the records in the inter-loop joined table via the XQuery plan executing unit 104. To control a correspondence to the records, the IDs stored in the tables are used. Further, according to the correspondence relationships among the tables, the XQuery plan executing unit 104 described below executes the plans. The details of the process will be explained later.

In the manner described above, the plans that have been created by the nested XQuery-plan creating unit 102 and the single XQuery-plan creating unit 103 are put together and output to the XQuery plan executing unit 104 by the nested XQuery-plan creating unit 102.

The XQuery plan executing unit 104 executes the processes according to the plans (including the plans to create the tables, to assign the identifiers, and to control a correspondence between the records) that have been input thereto by the nested XQuery-plan creating unit 102. Also, to execute the processes according to the input plans, the XQuery plan executing unit 104 calls operators in the various types of operating units, which are explained later.

The instructions that are used by the XQuery plan executing unit 104 and that have basic functions such as a cross product joining process, a natural joining process, and a link updating process will be referred to as operators. Examples of the operators include an operator for updating the table stored in the hierarchical table storage unit 111. Inputs and outputs between the operators are realized by using pointers and IDs in the hierarchical tables.

The cross product join operating unit 105 performs a cross product operation between the hierarchical tables. The cross product operation is equivalent to a cross product operation performed on a RDB. For example, the cross product join operating unit 105 performs a cross product joining process on the element tables according to the plan that has been created by the cross product joining unit 127.

The natural join operating unit 106 performs a natural join operation between the hierarchical tables. The natural join operation is equivalent to a natural join operation performed on an RDB.

The link update operating unit 107 performs an operation to update the IDs used for linking a plurality of tables positioned in mutually different hierarchical levels to one another. In the case where an ID is stored in each of a plurality of columns in the table obtained as a result of a joining process such as a cross product joining process, the link update operating unit 107 according to the first embodiment performs a process to update each of the combinations of IDs with a unique link ID.

The test operating unit 108 performs a comparison operation that uses, for example, an equality sign or an inequality sign. The comparison operation is equivalent to a selection operation in an RDB.

The data obtaining operating unit 109 obtains necessary data by performing an operation to go up the hierarchical levels toward the ancestors, or to go down the hierarchical levels toward the descendants, and to obtain texts, by following the links that connect the elements to one another, the elements being included in the XML data stored in the XML database 113.

The index obtaining operating unit 110 accesses the index data that has been assigned to the XML data in the XML database 113 and obtains the information that is stored as the index data. By combining the index obtaining operating unit and the data obtaining operating unit in the manner described above, it is possible to obtain the necessary data from the XML database 113 at a high speed.

As a result of the execution performed by the XQuery plan executing unit 104, the output unit 112 outputs XML data that matches the XQuery data that has been input as a query request.

Next, an overall processing procedure performed by the database processing apparatus 100 will be explained, with reference to FIG. 7.

First, the query receiving unit 101 receives an input of XQuery data from a user or the like (step S701).

Next, the nested XQuery-plan creating unit 102 and the single XQuery-plan creating unit 103 create plans to be executed, based on the XQuery data that has been input (step S702). The details of the processing procedure will be explained later.

After that, the XQuery plan executing unit 104 executes the created plans by using the various types of operating units (step S703). The details of the processing procedure will be explained later.

Lastly, the output unit 112 outputs the XML data that has been created as a result of the execution of the plans performed by the XQuery plan executing unit 104 (step S704).

As a result of the processing procedure described above, the database processing apparatus 100 is able to output the XML data that corresponds to the XQuery data that has been received as the input from the user or the like.

Next, the procedure that is shown at step S702 in FIG. 7 and is performed by the nested XQuery-plan creating unit 102 and the single XQuery-plan creating unit 103 to create the plans will be explained, with reference to FIG. 8.

First, the nested XQuery-plan creating unit 102 performs a syntax analysis on the XQuery data that has been input (step S801). The syntax analysis may be easily performed by using a compiler tool like Yacc & Lex.

Next, the nested XQuery-plan creating unit 102 judges if the XQuery data contains any nested structure, based on the result of the syntax analysis (step S802).

In the case where the nested XQuery-plan creating unit 102 has judged that the XQuery data contains no nested structure (step S802: No), the nested XQuery-plan creating unit 102 outputs the result of the syntax analysis to the single XQuery-plan creating unit 103. Accordingly, the single XQuery-plan creating unit 103 creates a single-structure plan so that processes can be performed based on the XQuery data that has been input (step S803). A method for creating the plan by using a syntax tree of the XQuery data containing no nested structure can be realized by using conventional techniques like the one disclosed in JP-A 2001-147933 (KOKAI) titled "Structured Document Retrieval Method, Structured Document Retrieval Apparatus, and Structured Document Retrieval System".

On the contrary, in the case where the nested XQuery-plan creating unit 102 has judged that the XQuery data contains one or more nested structures (step S802: Yes), the nested XQuery-plan creating unit 102 performs a process to decompose the XQuery data that has been input (step S804).

The decomposing process denotes a process to decompose the XQuery data shown in FIG. 4 into a piece of XQuery data shown in FIG. 9 and another piece of XQuery data shown in FIG. 10. The XQuery data shown in FIG. 4 can be decomposed into the two pieces of XQuery data by following the path operators contained in the XQuery data. More specifically, because the piece of XQuery data starting with "for $x in //DEPARTMENT" and the other piece of XQuery data starting with "for $y in //DECADE" are connected with each other by way of nesting, the nested XQuery-plan creating unit 102 performs the process to decompose the XQuery data into these pieces of XQuery data. As a result, a piece of XQuery data shown in FIG. 9 and another piece of XQuery data shown in FIG. 10 are generated. In the actual process, the results of the decomposing process may be syntax trees or decomposed elements, instead of the pieces of XQuery data.

Each of these pieces of XQuery data that have been obtained as a result of the decomposing process and that contain no nested structure will be referred to as a piece of single XQuery data. In addition, because the pieces of single XQuery data that have been obtained as the decomposing process involve a comparison condition such as one expressed by an equality sign, the information regarding the comparison condition is stored. It is possible to realize the method for performing the decomposing process by using a conventional technique. Thus, the explanation thereof will be omitted.

Next, the nested XQuery-plan creating unit 102 judges whether all the single-structure plans for executing the processes on the pieces of single XQuery data obtained as a result of the decomposing process have been created (step S805). In the case where the nested XQuery-plan creating unit 102 has judged that not all the single-structure plans have been created (step S805: No), the single XQuery-plan creating unit 103 creates one or more single-structure plans for performing the processes, based on the pieces of single XQuery data obtained as a result of the decomposing process (step S806). After that, the nested XQuery-plan creating unit 102 judges again whether all the plans have been created at step S805.

On the contrary, in the case where the nested XQuery-plan creating unit 102 has judged that all the single-structure plans for executing the processes on the pieces of single XQuery data obtained as a result of the decomposing processes have been created (step S805: Yes), a nested-structure joining plan is created so that the single-structure plans that have been created are jointed together while the comparison condition between the pieces of single XQuery data obtained as a result of the decomposing process is taken into consideration, the comparison condition having been stored in advance. Subsequently, a detailed plan is created by combining the single-structure plans that have already been created with the nested-structure joining plan (step S807). Thus, the processes are completed.

The nested-structure joining plan denotes a plan for joining the results of the processes that have been performed according to the plurality of single-structure plans described above, by using one or more of the three operating units that are namely the cross product join operating unit, the natural join operating unit, and the link update operating unit. After that, the XQuery plan executing unit 104 performs the processes according to the plans that have been created at steps S807 and S803. Next, the details of the process to create the plan performed at step S807 will be explained.

Figure 11:
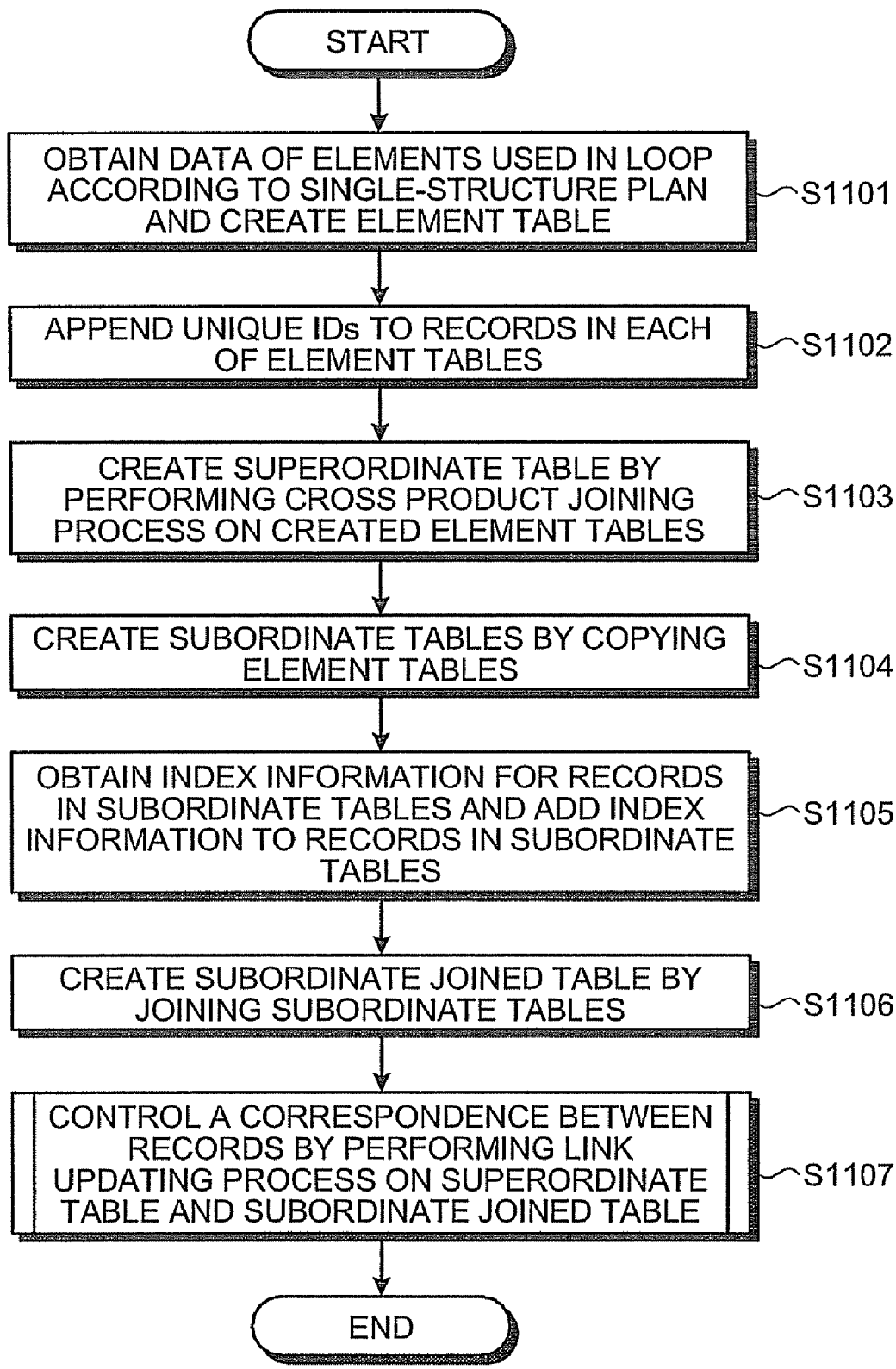
FIG. 11 is a flowchart of a plan creating procedure to realize a nested XQuery plan.

The procedure for creating the plan shown at step S807 in FIG. 8 will be explained, with reference to FIG. 11. The details of the created tables will be explained, with reference to FIG. 12.

First, the element table creating unit 124 included in the nested XQuery-plan creating unit 102 creates a plan for obtaining the data of the elements used in the loop according to the single-structure plan and creating an element table (step S1101). When this plan is executed, the data obtaining operating unit 109 is used to obtain the data of the elements. For example, for the single-structure plan corresponding to the single XQuery data shown in FIG. 9, "DISTRIBUTION" and "LIGHTWEIGHT" are obtained from the department data and its subordinates shown in FIG. 3 so that an element table including two records having one column is created. This process is performed for each of the single-structure plans.

Next, the identifier assigning unit 121 creates a plan for assigning a unique ID to each of the records in the element tables that have been created (step S1102). As a result, the element table described above becomes an element table that includes two records having two columns.

After that, the cross product joining unit 127 included in the table creating unit 123 creates a plan for creating a superordinate table by performing a cross product joining process on the element tables to which the unique IDs have been assigned (step S1103).

According to the first embodiment, the tables are created by following the hierarchical levels of the nested structure in the XQuery data. A table that corresponds to the superordinate hierarchical level will be referred to as a superordinate table, whereas a table that is positioned subordinate to the superordinate table will be referred to as a subordinate table. The superordinate table corresponds to a main query, whereas the subordinate table corresponds to a sub query. However, examples of the tables are not limited to the superordinate table and the subordinate table. In the case where the XQuery data that has been input contains a larger number of nested structures, it is acceptable to create tables that correspond to a larger number of hierarchical levels, according to the nested structures.

Subsequently, the single-loop table creating unit 125 creates a plan for creating subordinate tables by copying the element tables (step S1104).

After that, the index information obtaining unit 128 creates a plan for the index obtaining operating unit 110 to obtain a corresponding piece of index information for each of the records in the subordinate tables and to add each of the obtained pieces of index information to the corresponding record in the subordinate tables (step S1105).

Subsequently, the joined table creating unit 126 creates a plan for creating a subordinate joined table by joining the subordinate tables (step S1106). This joining process is realized by using the joining method according to the single-structure plan created by the nested XQuery-plan creating unit 102 described above.

After that, according to an instruction from the correspondence controlling unit 122, the link update operating unit 107 creates a plan for controlling a correspondence between the records in the superordinate table and the records in the subordinate joined table into, by performing a link updating process on the superordinate table and the subordinate joined table (step S1107). The details of the processing procedure will be explained later.

By executing the plans that have been created in the processes described above, it is possible to reduce the amount of calculation compared to the conventional processes in the case where XQuery data having a nested structure has been received as an input. Next, to make it clear that the amount of calculation is reduced, the procedure for executing the plans that have been created in the processes described above will be explained, together with examples of the created tables, with reference to FIG. 12. The XML data that is used as the target of the processes is the one shown in FIG. 2.

First, according to the plan that has been created by the element table creating unit 124, the data obtaining operating unit 109 obtains the data column corresponding to $x in FIG. 9 (step S1201). As a result, the element table creating unit 124 creates an element table HT1.

Also, the data obtaining operating unit 109 obtains the data column corresponding to $y in FIG. 10 (step S1202). As a result, the XQuery plan executing unit 104 creates an element table HT2. The element tables HT1 and HT2 that have been created are stored into the hierarchical table storage unit 111. The processes at steps S1201 and S1202 correspond to the operator "/" in XQuery.

Next, according to the plan that has been created by the identifier assigning unit 121, the XQuery plan executing unit 104 assigns unique IDs "A1" and "A2" to the records, respectively, in the second column of the created element table HT1 (step S1203), so as to create an element table HT3.

Also, according to the plan that has been created by the identifier assigning unit 121, the XQuery plan executing unit 104 assigns unique IDs "B1" and "B2" to the records, respectively, in the second column of the created element table HT2, (step S1204), so as to create an element table HT4.

After that, according to the plan that has been created by the cross product joining unit 127, the cross product join operating unit 105 creates a superordinate table HT5 by performing a cross product joining process on the element table HT3 and the element table H4 (step S1205).

Subsequently, according to the plan that has been created by the single-loop table creating unit 125, the XQuery plan executing unit 104 copies the element table HT3 so as to create a subordinate table HT6 (Step S1206). Also, according to the plan that has been created by the single-loop table creating unit 125, the XQuery plan executing unit 104 copies the element table HT4 so as to create a subordinate table HT7 (Step S1207).

As explained above, the subordinate table HT6 is made up of two records that are namely ["A1", "DISTRIBUTION"] and ["A2", "LIGHTWEIGHT"]. In this situation, according to the plan that has been created by the index information obtaining unit 128, the index obtaining operating unit 110 performs the process to obtain index information, by using the departments indicated in the second column as a search key (step S1208). To obtain the index information, the index 1, which has been explained as the conventional technique above, is used. After that, according to the plan that has been created by the single-loop table creating unit 125, the XQuery plan executing unit 104 assigns a set made up of the obtained index information to the subordinate table HT6 in the third column thereof, so as to create a subordinate table HT8.

In addition, by performing the same process to the subordinate table HT7, the XQuery plan executing unit 104 creates a subordinate table HT9 (step S1209).

The processes to create the tables starting with the element table HT1, via the element table HT3 and the subordinate table HT6, and then, the subordinate table HT8, are executed according to the single-structure plan corresponding to the single XQuery data shown in FIG. 9. On the other hand, the processes to create the tables starting with the element table HT2, via the element table HT4 and the subordinate table HT7, and then, the subordinate table HT9, are executed according to the single-structure plan corresponding to the single XQuery data shown in FIG. 10. The processes thereafter, which are namely the cross product joining process at step S1205, the natural joining process at step S1210, and the link updating process at step S1211, correspond to the operators created in the addition of the nested-structure joining plan shown at step S807 in FIG. 8.

After that, according to the plan that has been created by the joined table creating unit 126, the XQuery plan executing unit 104 creates a subordinate joined table HT10, by joining the subordinate table HT8 and the subordinate table HT9 (step S1210). In this joining process, a natural joining process performed by the natural join operating unit 106 is used.

Subsequently, according to the plan that has been created by the correspondence controlling unit 122, the link update operating unit 107 performs a link updating process on the superordinate table HT5 and the subordinate joined table HT10, so as to create a superordinate table HT11 and a subordinate joined table HT12 and to control a correspondence the records in the superordinate table HT11 and the records in the subordinate joined table HT12 (step S1211). In other words, the link update operating unit 107 updates each of the combinations of "A1" and "B1" appearing in the third and the fourth columns (which are called "complex link columns") of the superordinate table HT5 and in the first and the second columns (which are also called "complex link columns") of the subordinate joined table HT10, with a unique ID "C1" arranged in a single-structure column (i.e., a single link column). In the similar manner, the link update operating unit 107 updates each of the combinations of IDs in the other complex link columns with a unique link ID arranged in a single-structure column. As a result, the correspondence relationships among the records have become clear, and the process ends. Each of the unique link IDs may have any value. For example, instead of C1, C2, and so on, natural numbers that are arranged in the ascending order such as 1, 2, 3, and so on may be assigned as the unique link IDs. This process may be implemented by using a memory data structure such as a hash table that can be accessed at a high speed. The details of the processing procedure will be explained later.

After that, the XQuery plan executing unit 104 adjusts the form of the superordinate table HT11 and the subordinate joined table HT12 that have been created, so that they represent XML data that is in the format written in the RETURN clause. As a result, the XML data as shown in FIG. 5 is obtained.

To summarize, according to the conventional processing procedure, after the process on the outer XQuery data has been finished, the results of the finished process is forwarded, as the set of input variables, to the process corresponding to the inner XQuery data, so that the inner XQuery data can be processed. In contrast, in the processing procedure according to the first embodiment, although the results are forwarded to the process corresponding to the inner XQuery data in the same manner, the present invention is different from the conventional technique in that the output results from the cross product join operating unit are not copied, and that each of the records in the table created by the cross product join operating unit is not copied so that a table is created.

Figure 6A:
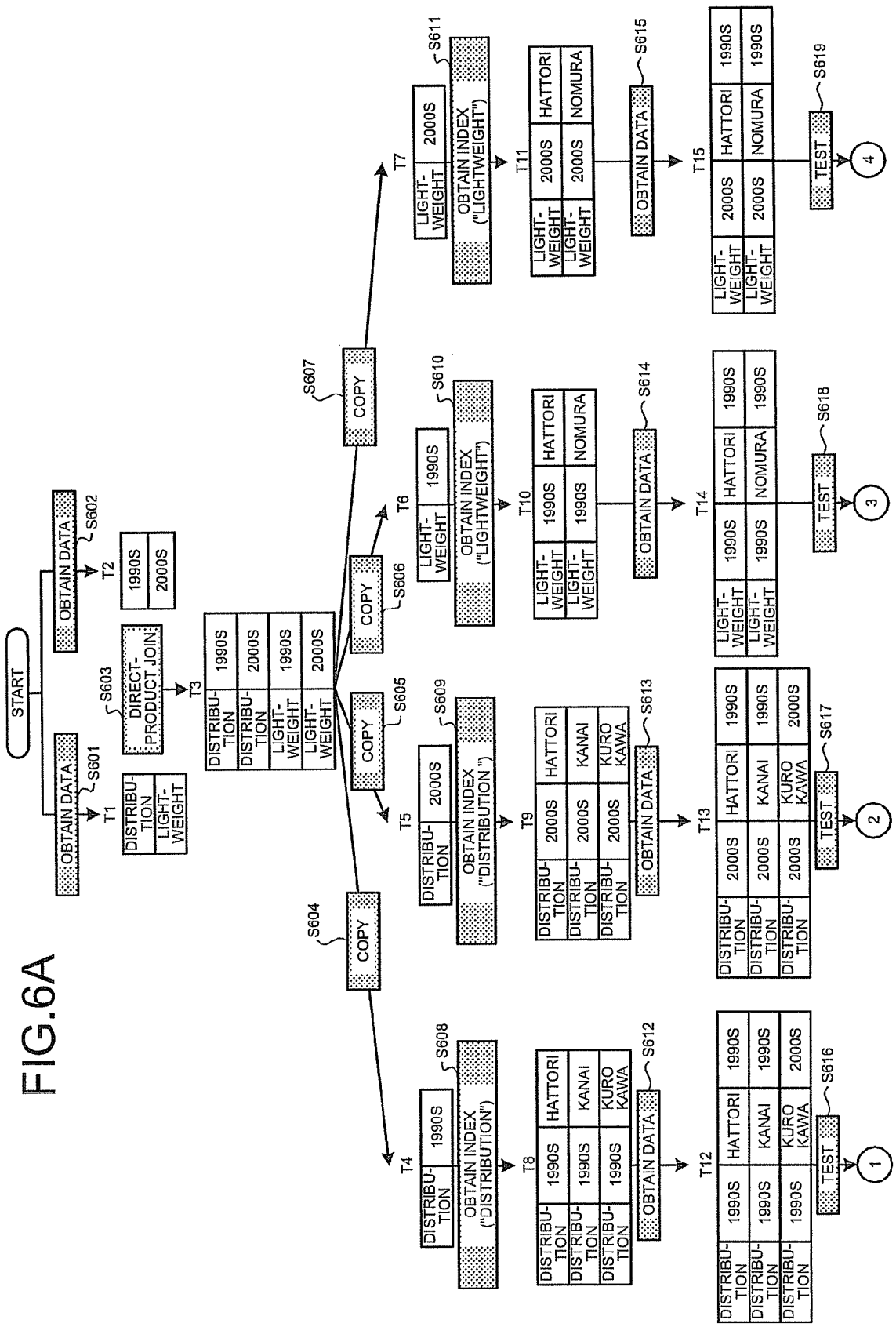
FIG. 6A is a drawing for explaining a first example in which a conventional processing procedure is performed on an input of the XQuery data shown in FIG. 4.
Figure 12:
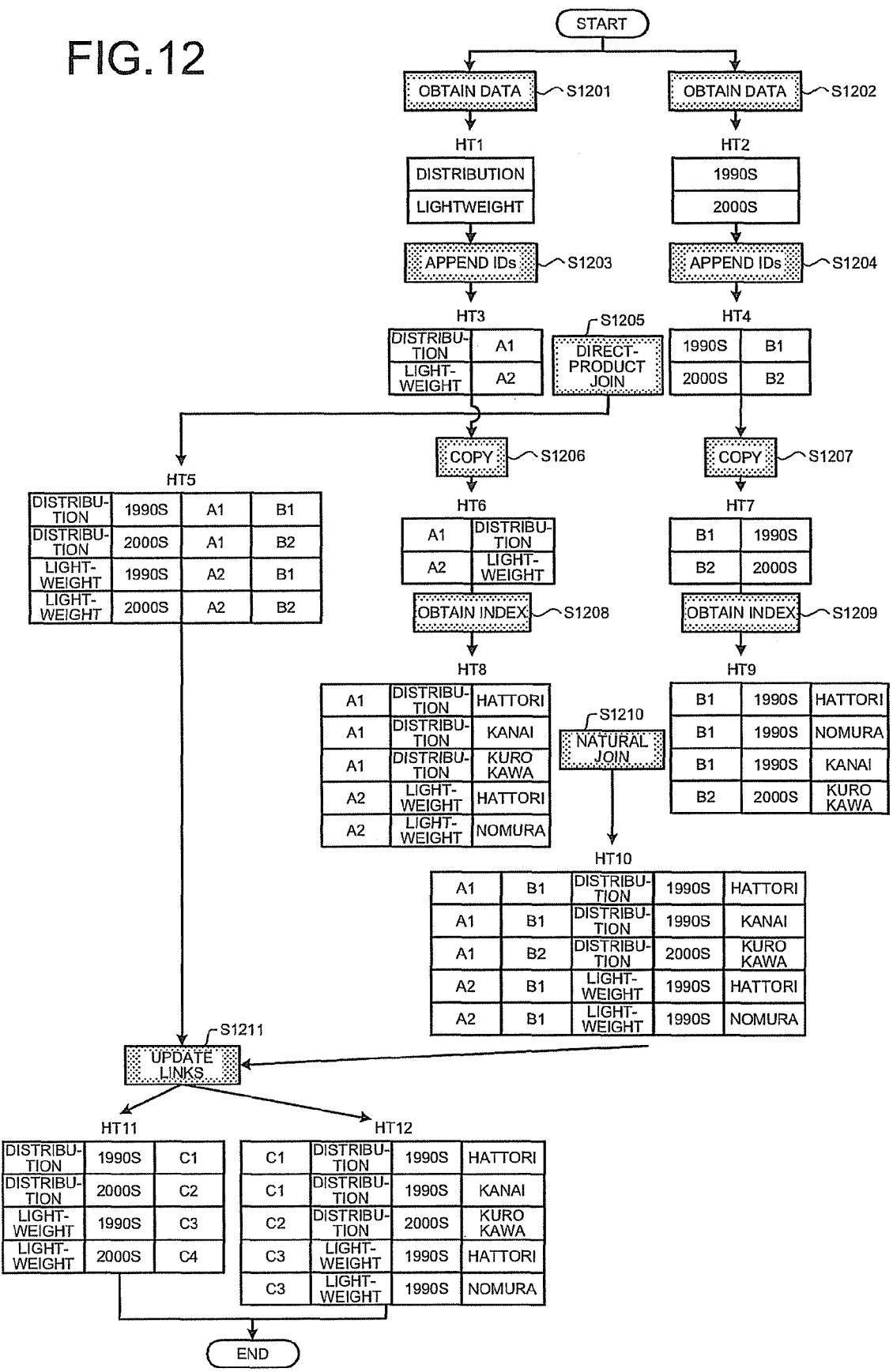
FIG. 12 is a drawing for explaining a first example of a plan executing process performed by an XQuery plan executing unit, together with created tables.

In other words, in the conventional processing procedure shown in FIGS. 6A and 6B, the process on the nested structure is performed as many times as the number of loops in the multiple loops in the superordinate hierarchical level; however, in the processing procedure shown in FIG. 12, there is no such repetition. Accordingly, when the number of times the process is performed in the example shown in FIGS. 6A and 6B is compared with the number of times the process is performed in the example shown in FIG. 12, it is clear that there is a difference in the number of times the operators are executed. Also, in view of the difference between the processes, it is understood that, when the number of loops in the multiple loops in the superordinate hierarchical level increases, the difference in the level of performance will be much larger.

Figure 13:
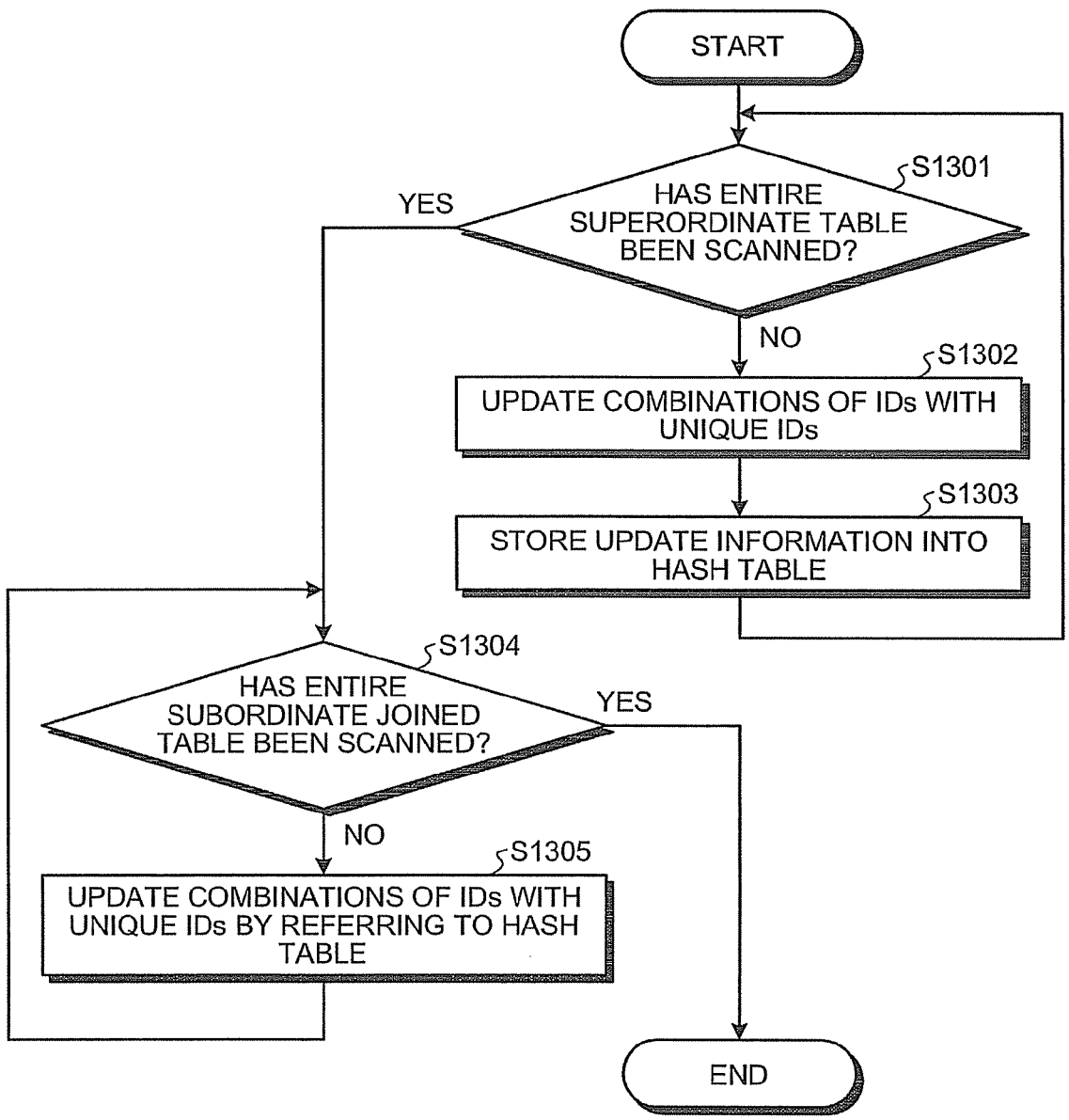
FIG. 13 is flowchart of a procedure in a link updating process performed by a link update operating unit.

Next, the processing procedure performed by the link update operating unit 107 to perform the link updating process according to the plan that has been created by the correspondence controlling unit 122 will be explained, with reference to FIG. 13.

First, the link update operating unit 107 judges whether all the records in the superordinate table have entirely been scanned (step S1301). In the case where the link update operating unit 107 has judged that not all the records have entirely been scanned (step S1301: No), the link update operating unit 107 updates each of the combinations of IDs that are stored in the complex link columns within the records that have not been scanned yet, with a unique link ID (step S1302).

After that, the link update operating unit 107 stores update information into a hash table (step S1303).

On the contrary, in the case where the link update operating unit 107 has judged that all the records in the superordinate table have entirely been scanned (step S1301: Yes), the link update operating unit 107 judges whether all the records in the subordinate joined table have been scanned (step S1304). In the case where the link update operating unit 107 has judged that not all the records have been scanned (step S1304: No), the link update operating unit 107 updates each of the combinations of IDs that are stored in the complex link columns within the records that have not been scanned yet, with a unique link ID, by referring to the hash table (step S1305).

On the contrary, in the case where the link update operating unit 107 has judged that all the records have been scanned (step S1304: Yes), the process ends.

By performing the processing procedure described above, it is possible to control a correspondence between the records in the superordinate table and the records in the subordinate joined table.

The present invention is no limited to the exemplary embodiments described above. It is possible to modify the present invention in various ways as explained in the examples below.

In the first embodiment described above, the example in which the subordinate tables are joined together only by the natural joining process is explained; however, the method that can be used for joining the subordinate tables together is not limited to the natural joining process.

In a first modification example of the present invention, an example in which a test process is performed in addition to the natural joining process will be explained. The configuration of the database processing apparatus 100 is the same as the one according to the first embodiment. Thus, the explanation thereof will be omitted.

In the first modification example, it is assumed that the query receiving unit 101 has received an input of the XQuery data shown in FIG. 14. The XQuery data shown in FIG. 14 is different from the XQuery data shown in FIG. 4 in that "and $x/@id!=$y/@id" is added in the line indicated with the reference character 1401.

Figure 15:
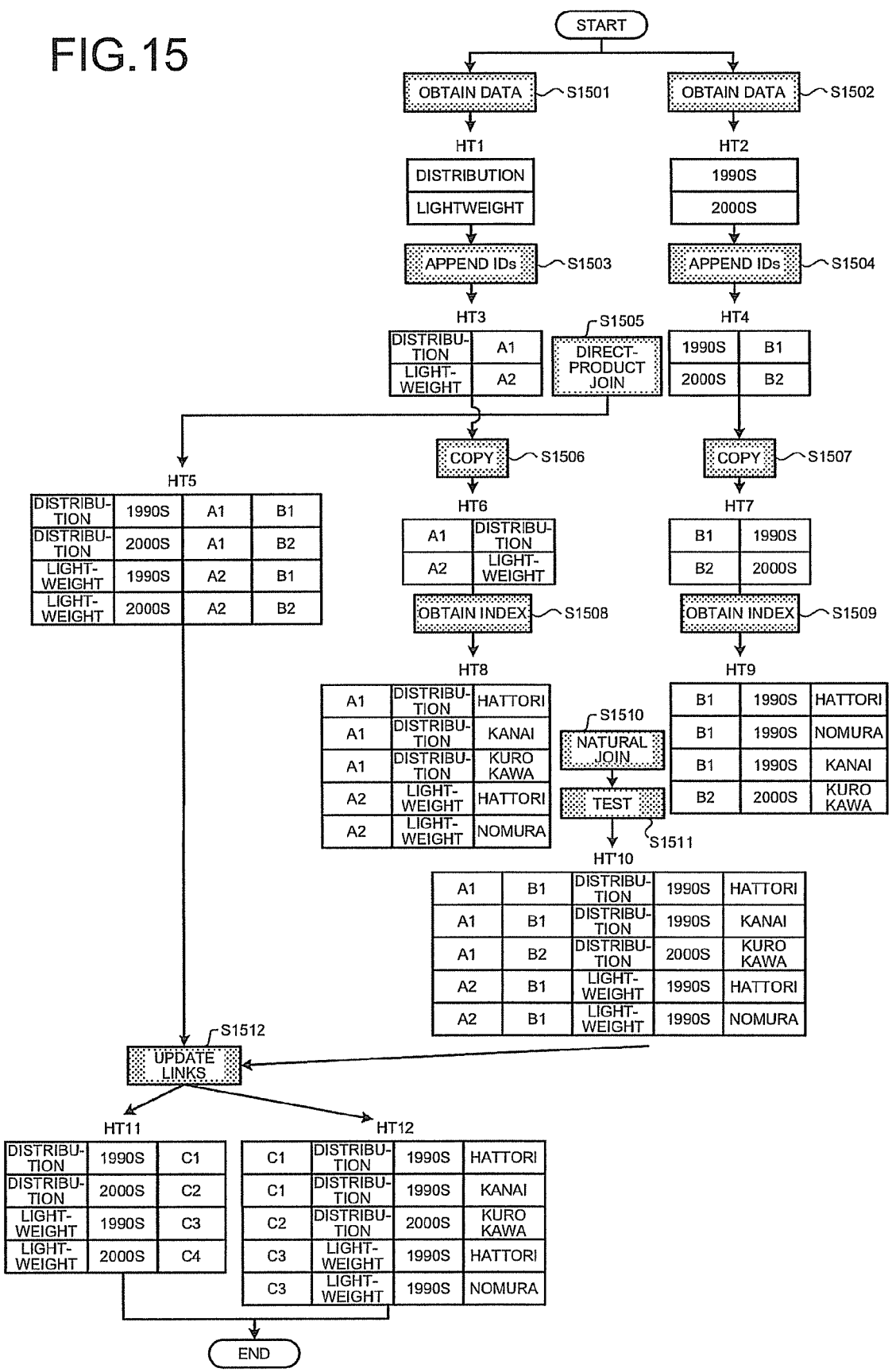
FIG. 15 a drawing for explaining a second example of the plan executing process performed by the XQuery plan executing unit, together with created tables.

The processing procedure to be performed according to a plan created in this situation will be explained, with reference to FIG. 15.

First, in the same manner as the processes are performed at steps S1201 through S1210 shown in FIG. 12 according to the first embodiment, according to the plans that have been created, a superordinate table HT'5 is created, and also, subordinate tables HT'8 and HT'9 are joined together by a natural joining process (steps S1501 through S1510).

After that, in the database processing apparatus 100 according to the first modification example, the test operating unit 108 performs a test process on the table that has been created as a result of the natural joining process performed on the subordinate tables (step S1511). During this test process, only the records that match the condition "and $x/@id!=$y/@id" are extracted out of the records within the table that has been created as a result of the natural joining process. As a result, a subordinate joined table HT'10 is created.

After that, according to a plan that has been created by the correspondence controlling unit 122, the link update operating unit 107 performs a link updating process on the superordinate table HT'5 and the subordinate joined table HT'10, so as to create a superordinate table HT'11 and a subordinate joined table HT'12 and controls a correspondence between the records in the superordinate table HT'11 and the records in the subordinate joined table HT'12 (step S1512).

As explained in the first modification example, during the joining process performed on the subordinate tables, it is acceptable to perform the test process in addition to the natural joining process. As explained here, the joining process performed on the subordinate tables may vary depending on the XQuery data that has been input. In other words, depending on the XQuery data that has been input, it is acceptable to join the subordinate tables by using a joining process other than the natural joining process.

In the first embodiment described above, the processes that are performed in the case where the XQuery data contains double loops due to the nested structure are explained. However, the exemplary embodiments are not limited to the example in which the XQuery data contains double loops. As a second modification example of the present invention, an example in which the present invention is applied to the case where the XQuery data contains triple or more loops will be explained. The configuration of the database processing apparatus 100 is the same as the one according to the first embodiment. Thus, the explanation thereof will be omitted.

In the second modification example, it is assumed that the query receiving unit 101 included in the database processing apparatus 100 has received an input of the XQuery data shown in FIG. 16. The XQuery data shown in FIG. 16 is different from the XQuery data shown in FIG. 4 in that a loop "for $d in (MALE, FEMALE)" is added as shown in the line indicated with the reference character 1601.

Figures 18, 19, 20:
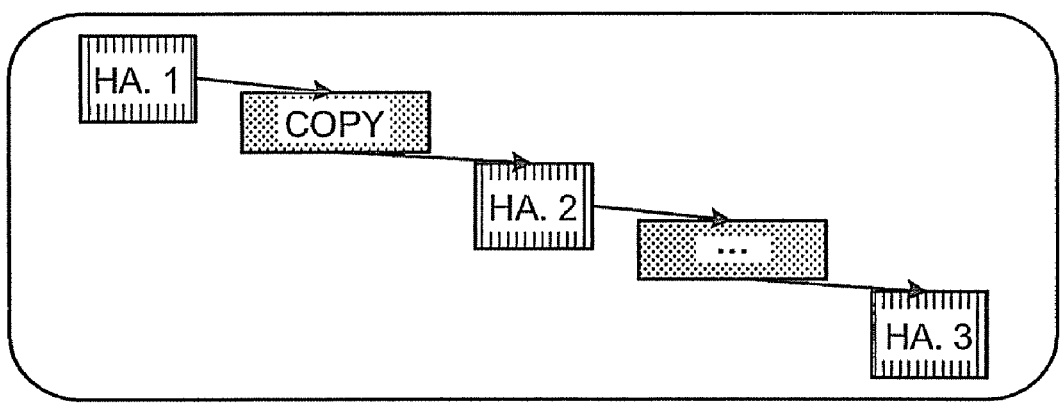
FIG. 18 is a diagram illustrating a second example of single XQuery data obtained by decomposing the XQuery data shown in FIG. 16.
FIG. 19 a diagram illustrating a third example of single XQuery data obtained by decomposing the XQuery data shown in FIG. 16.
FIG. 20 is a drawing for explaining a procedure in a process to create tables according to a plan corresponding to the single XQuery data shown in FIG. 17.

Accordingly, the nested XQuery-plan creating unit 102 extracts pieces of single XQuery data as shown in FIGS. 17 to 19 out of the XQuery data shown in FIG. 16. Subsequently, the single XQuery-plan creating unit 103 creates plans that correspond to these pieces of single XQuery data.

Figure 21:
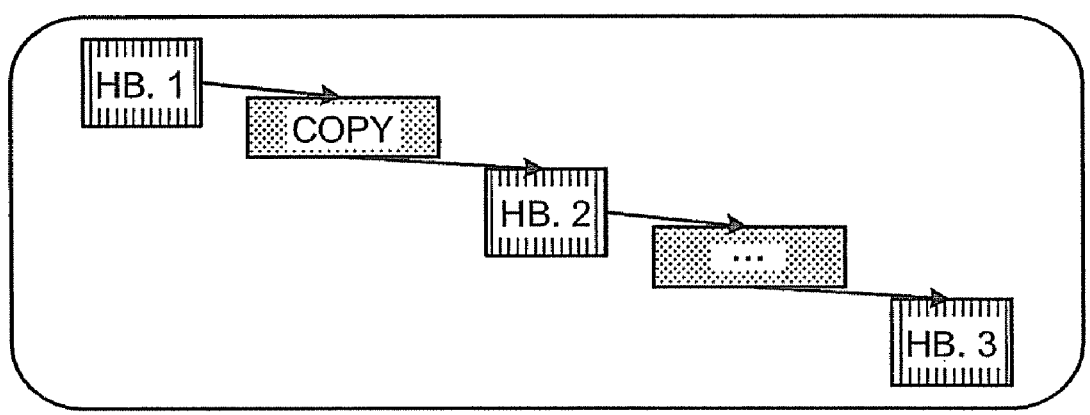
FIG. 21 is a drawing for explaining a procedure in a process to create tables according to a plan corresponding to the single XQuery data shown in FIG. 18.

After that, the XQuery plan executing unit 104 executes the plans that correspond to the pieces of single XQuery data shown in FIGS. 17 to 19. The process that corresponds to the piece of single XQuery data shown in FIG. 17 is shown in FIG. 20. Also, the process that corresponds to the piece of single XQuery data shown in FIG. 18 is shown in FIG. 21. Further, the process that corresponds to the piece of single XQuery data shown in FIG. 19 is shown in FIG. 22.

During the process shown in FIG. 20, it is assumed that, in the same manner as in the first embodiment, after an element table HA.1 related to the department data has been created, a hierarchical table HA.2 is created by copying the element table HA.1. Also, a hierarchical table HA.3 is created by performing a process like the index obtaining process.

During the process shown in FIG. 21, it is assumed that, in the same manner as in the first embodiment, after an element table HB.1 related to the decade data has been created, a hierarchical table HB.2 is created by copying the element table HB.1. Also, a hierarchical table HB.3 is created by performing a process like the index obtaining process.

Figure 22:
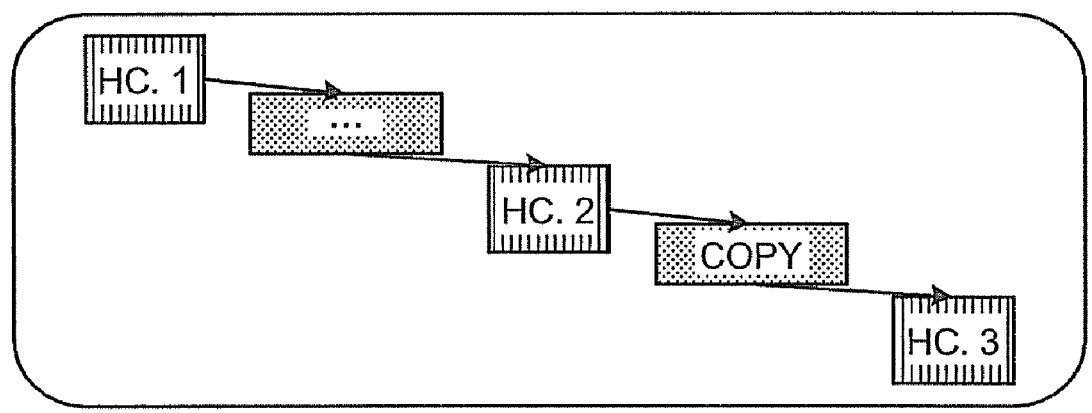
FIG. 22 is a drawing for explaining a procedure in a process to create tables according to a plan corresponding to the single XQuery data shown in FIG. 19.

During the process shown in FIG. 22, because the XML data contains no elements related to male or female, a blank table HC.1 is created. After that, as a process corresponding to the process like the index obtaining process, MALE and FEMALE are added as separates records, and a column including unique IDs is assigned so that a hierarchical table HC.2 is created. Subsequently, by copying the hierarchical table HC.2, a table HC.3 is created.

Figure 23:
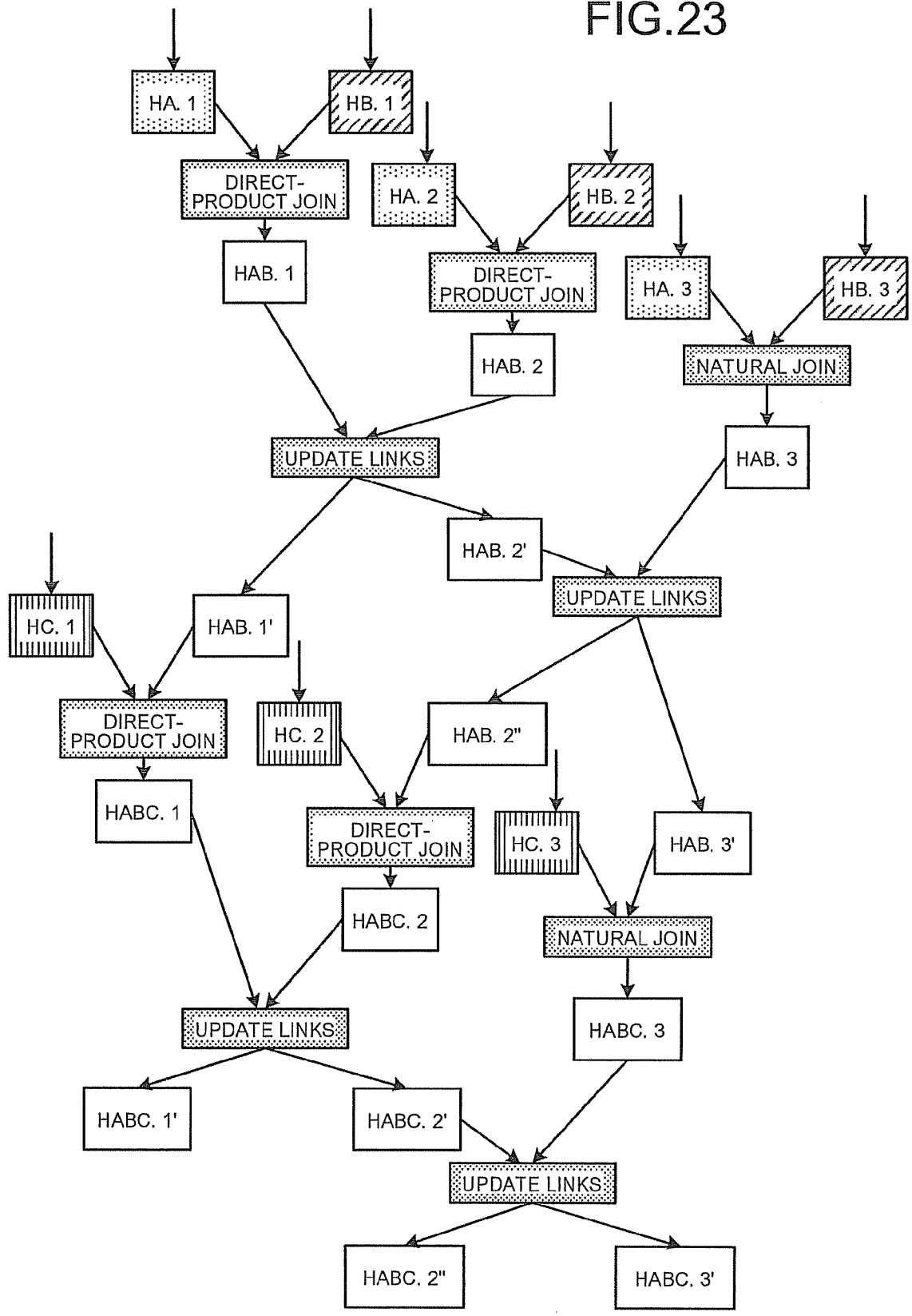
FIG. 23 is a drawing for explaining a procedure in a process to obtain a processing result from the XQuery data shown in FIG. 16, by performing cross product joining processes, natural joining processes, and link updating processes on the tables created in the processes shown in FIGS. 20 to 22.

The process to bring the tables that have been created in the processes shown in FIGS. 20 to 22 into correspondence with one another is shown in FIG. 23. As shown in FIG. 23, by repeating the set of processes made up of two cross product joining processes, one (natural) joining process, and two link updating processes as many times as the number obtained by subtracting one from the number of loops caused by the nested structure within the XQuery data, it is possible to realize the processes requested by the XQuery data. Accordingly, it is possible to apply the present invention to XQuery data having a nested structure that has triple or more loops.

More specifically, after a cross product joining process, another cross product joining process, and a natural joining process are performed on the element table HA.1, the hierarchical table HA.2, and the hierarchical table HA.3 shown in FIG. 20 and on the element table HB.1, the hierarchical table HB.2, and the hierarchical table HB.3 shown in FIG. 21, a link updating process is performed on the tables that are obtained as a result of the joining processes. As a result, a cross product joined table HAB.1', a cross product joined table HAB.2", and a natural joined table HAB.3' are created.

After that, after a cross product joining process, another cross product joining process, and a natural joining process are performed on the element table HC.1 (which is a blank table in the second modification example), the hierarchical table HC.2, and the hierarchical table HC.3 shown in FIG. 22 and on the cross product joined table HAB.1', the cross product joined table HAB.2", and the natural joined table HAB.3' that have been obtained from the processes described above, a link updating process is performed on the tables that are obtained as a result of the joining processes. As a result, a cross product joined table HABC.1', a cross product joined table HABC.2", and a natural joined table HABC.3' are created.

In the processes described above, for example, the cross product join operating unit 105 creates the cross product joined table HABC.1 by performing a cross product joining process on the cross product joined table HAB.1' on which the link updating process has already been performed and the element table HC.1. Also, the cross product join operating unit 105 creates the cross product joined table HABC.2 by performing a cross product joining process on the cross product joined table HAB.2' on which the link updating process has already been performed and the hierarchical table HC.2 on which no joining process has been performed. In this process, because the table HC.1 is a blank table, the cross product joined table HAB.1' becomes the cross product joined table HABC.1.

Also, the joined table creating unit 126 creates a plan for creating a natural joined table HABC.3 obtained by performing a natural joining process on the table HC.3 on which no joining process has been performed and the natural joined table HAB.3' on which the link updating process has already been performed.

Further, the correspondence controlling unit 122 creates a plan for controlling a correspondence the cross product joined table HABC.1 and the cross product joined table HABC.2 by performing a link updating process and also a plan for controlling a correspondence the cross product joined table HABC.2' that has already been controlled and the natural joined table HABC.3 by performing a link updating process. As a result, the correspondence relationships as explained below are generated.

As shown in FIG. 24, the tables HABC.1' and HABC.2' that have been created in the processes described above are brought into correspondence with each other by unique identifiers "K1" to "K4". Also, the tables HABC.2" and HABC.3' are brought into correspondence with each other by unique identifiers "J1" to "J5".

In the database processing apparatus 100 according to the second modification example, by performing the processes according to the procedure described above, it is possible to reduce the amount of calculation even in the case where the XML data is processed based on the XQuery data having multiple loops containing triple or more loops due to the nested structure.

As shown in FIG. 25, the database processing apparatus 100 explained above includes, as its hardware configuration, a Read-Only Memory (ROM) 2502 that stores therein, for example, a database processing computer program for performing the processes described above, a Central Processing Unit (CPU) 2501 that controls the constituent elements of the database processing apparatus 100 according to the computer program stored in the ROM 2502, a Random Access Memory (RAM) 2503 that stores therein various types of necessary data, a communication interface (I/F) 2504 that establishes a connection to a network and performs communication, and a bus 2505 that connects these constituent elements to one another.

An arrangement is acceptable in which the database processing computer program is provided as being recorded on a computer-readable recording medium such as a Compact Disk Read-Only Memory (CD-ROM), a Floppy (a registered trademark) Disk (FD), a Digital Versatile Disk (DVD), or the like, in a file that is in an installable format or in an executable format.

In that situation, the computer program is loaded into a main storage device (e.g., the RAM 2503) as being read from the recording medium and executed within the database processing apparatus 100, so that the constituent elements explained in the software configuration described above are generated in the main storage device.

Another arrangement is acceptable in which the computer program according to the exemplary embodiments is stored in a computer connected to a network such as the Internet, so that the computer program is provided as being downloaded via the network.

The present invention has been explained through the exemplary embodiments; however, various modifications and improvements can be made to these exemplary embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the assigned claims and their equivalents.

What is claimed is:

1. A database processing apparatus comprising:
   a receiving unit that receives an obtaining request for requesting a process of obtaining information that is in correspondence with the same element as each of elements stored in partial syntax trees contained in the structured database, from another partial syntax tree, the process being a process of performing multiple loops in a nested structure, and the each of elements being used as a variable in each of the multiple loops;
   an identifier assigning unit that assigns a unique identifier to each of records stored in element tables, each of the element tables being created for each of the loops in the multiple loops;
   a joining unit that creates a cross product joined table in which a plurality of identifiers are assigned to each of records, by performing a cross product joining process on the element tables to which the identifiers have been assigned;
   an information obtaining unit that obtains information that is specified as an obtained target in the obtaining request based on the elements included in each of the element tables;
   a single-loop table creating unit that creates, for each of the loops, a single-loop table that stores records in which the obtained information, the identifiers, and the elements are brought into correspondence with one another;
   a joined table creating unit that creates an inter-loop 3oined table to which a plurality of identifiers are assigned, by joining the single-loop tables each of which is created for each of the loops; and
   a correspondence controlling unit that controls a correspondence between the records in the cross product joined table and the records in the inter-loop joined table, based on the plurality of identifiers assigned to the cross product joined table and the plurality of identifiers assigned to the inter-loop joined table; wherein
   the receiving unit receives an obtaining request for requesting the process of obtaining information that is in correspondence with the same element as each of elements stored in partial syntax trees contained in the structured database, from another partial syntax tree, the process being the process of performing multiple loops in a nested structure, and the each of elements being used as a variable in each of loops in triple or more loops,
   the joining unit further creates a first multiple cross product joined table by performing a cross product joining process on a first cross product joined table that is controlled by the correspondence controlling unit and a first single-loop table that is not controlled by the correspondence controlling unit, and also creates a second multiple cross product joined table by performing a cross product joining on a second cross product joined table that is controlled by the correspondence controlling unit and a second single-loop table that is not controlled by the correspondence controlling unit, the joined table creating unit further creates an inter-multiple-loop joined table by joining a third single-loop table that is not controlled by the correspondence controlling unit and a third inter-loop joined table that is controlled by the correspondence controlling unit, and the correspondence controlling unit further controls a correspondence between the first multiple cross product joined table and the second multiple cross product joined table, and also controls a correspondence between the second multiple cross product joined table that is controlled and the inter-multiple-loop joined table;

the receiving unit receives the obtaining request in an XQuery format for requesting the obtaining process performed on the structured database in an XML format.

2. The apparatus according to claim 1, further comprising an updating unit that updates for each of combinations of a plurality of identifiers with a unique link identifier.

3. The apparatus according to claim 1, wherein the joined table creating unit performs a predetermined operation according to a join condition indicated within a nested structure in the obtaining request, after joining a plurality of the single-loop tables.

4. A database processing method comprising:

receiving an obtaining request for requesting a process of obtaining information that is in correspondence with the same element as each of elements stored in partial syntax trees contained in the structured database, from another partial syntax tree, the process being a process of performing multiple loops in a nested structure, and the each of elements being used as a variable in each of the multiple loops;

assigning a unique identifier to each of records stored in element tables, each of the element tables being created for each of the loops in the multiple loops;

creating a cross product joined table in which a plurality of identifiers are assigned to each of records, by performing a cross product joining process on the element tables to which the identifiers is assigned;

obtaining information that' is specified as an obtained target in the obtaining request based on the elements included in each of the element tables;

creating, for each of the loops, a single-loop table that stores records in which the obtained information, the identifiers, and the elements are brought into correspondence with one another;

creating an inter-loop joined table to which a plurality of identifiers are assigned, by joining the single-loop tables each of which is created for each of the loops; and controlling a correspondence between the records in the cross product joined table and the records in the inter-loop joined table, based on the plurality of identifiers assigned to the cross product joined table and the plurality of identifiers assigned to the inter-loop joined table; wherein at the receiving an obtaining request for requesting the process of obtaining information that is in correspondence with the same element as each of elements stored in partial syntax trees contained in the structured database, from another partial syntax tree, the process being the process of performing multiple loops in a nested structure, and the each of elements being used as a variable in each of loops in triple or more loops;

at the creating of a cross product joined table, a multiple cross product joined table is further created by performing a cross product joining process on the cross product joined table that is controlled at the controlling and one of the single-loop tables that is not controlled at the controlling;

at the creating of an inter-loop joined table, an inter-multiple-loop joined table is further created by joining another one of the single-loop tables that is not controlled at the controlling and the inter-loop joined table that is controlled at the controlling; and at the controlling, the correspondence between the cross product joined table and the multiple cross product joined table are further controlled, and also, a correspondence between the multiple cross product joined table that is controlled and the inter-multiple-loop joined table are controlled;

at the at the receiving of an obtaining request, the obtaining request in an XQuery format is received, the obtaining request requesting the obtaining process performed on the structured database in an XML format.

5. The method according to claim 4, further comprising updating for each of combinations of a plurality of identifiers with a unique link identifier.

6. The method according to claim 4, wherein, at the creating of an inter-loop joined table, a predetermined operation according to a join condition indicated within a nested structure in the obtaining request is performed, after joining a plurality of the single-loop tables.

7. A computer program product having a computer readable medium including programmed instructions for processing database, wherein the inst computer, cause the computer to perform:

receiving an obtaining request for requesting a process of obtaining information that is in correspondence with the same element as each of elements stored in partial syntax trees contained in the structured database, from another partial syntax tree, the process being a process of performing multiple loops in a nested structure, and the each of elements being used as a variable in each of the multiple loops;

assigning a unique identifier to each of records stored in element tables, each of the element tables being created for each of the loops in the multiple loops;

creating a cross product joined table in which a plurality of identifiers are assigned to each of records, by performing a cross product joining process on the element tables to which the identifiers is assigned;

obtaining information that is specified as an obtained target in the obtaining request based on the elements included in each of the element tables;

creating, for each of the loops, a single-loop table that stores records in which the obtained information, the identifiers, and the elements are brought into correspondence with one another;

creating an inter-loop joined table to which a plurality of identifiers are assigned, by joining the single-loop tables each of which is created for each of the loops; and controlling a correspondence between the records in the cross product joined table and the records in the inter-loop joined table, based on the plurality of identifiers assigned to the cross product joined table and the plurality of identifiers assigned to the inter-loop joined table; wherein at the receiving an obtaining request for requesting the process of obtaining information that is in correspondence with the same element as each of elements stored in partial syntax trees contained in the structured database, from another partial syntax tree, the process being the process of performing multiple loops in a nested structure, and the each of elements being used as a variable in each of loops in triple or more loops;

at the creating of a cross product joined table, a multiple cross product joined table is further created by performing a cross product joining process on the cross product joined table that is controlled at the controlling and one of the single-loop tables that is not controlled at the controlling into correspondence;

at the creating of an inter-loop joined table, an inter-multiple-loop joined table is further created by joining another one of the single-loop tables that is not controlled at the controlling and the inter-loop joined table that is controlled at the controlling; and at the controlling, the correspondence the cross product joined table and the multiple cross product joined table are further controlled, and also, a correspondence between the multiple cross product joined table that is controlled and the inter-multiple-loop joined table are controlled;

at the at the receiving of an obtaining request, the obtaining request in an XQuery format is received, the obtaining request requesting the obtaining process performed on the structured database in an XML format.

8. The computer program product according to claim 7, wherein the instructions cause the computer to further perform updating for each of combinations of a plurality of identifiers with a unique link identifier.

9. The computer program product according to claim 7, wherein, at the creating of an inter-loop joined table, a predetermined operation according to a join condition indicated within a nested structure in the obtaining request is performed, after joining a plurality of the single-loop tables.

* * * * *